US 9,047,007 B2

(12) United States Patent
Kodosky et al.

(10) Patent No.: US 9,047,007 B2
(45) Date of Patent: Jun. 2, 2015

(54) SEMANTIC ZOOM WITHIN A DIAGRAM OF A SYSTEM

(75) Inventors: Jeffrey L. Kodosky, Austin, TX (US); David W Fuller, III, Austin, TX (US); Jeffrey N. Correll, Cedar Park, TX (US); Mohammed Kamran Shah, Austin, TX (US); Jacob Kornerup, Austin, TX (US); Timothy J. Hayles, Austin, TX (US); Adam K. Gabbert, Austin, TX (US); Christopher G. Cifra, Austin, TX (US); Jenifer M. Loy, Austin, TX (US); Scott D. Postma, Leander, TX (US); Richard M. Ashby, Austin, TX (US); Charles E. Crain, II, Austin, TX (US)

(73) Assignee: National Instruments Corporation, Austin, TX (US)

( * ) Notice: Subject to any disclaimer, the term of this patent is extended or adjusted under 35 U.S.C. 154(b) by 260 days.

(21) Appl. No.: 13/193,228

(22) Filed: Jul. 28, 2011

(65) Prior Publication Data

US 2013/0031508 A1 Jan. 31, 2013

(51) Int. Cl.
*G06F 3/0481* (2013.01)
*G06F 3/0488* (2013.01)
*G06F 3/041* (2006.01)

(52) U.S. Cl.
CPC .......... *G06F 3/04883* (2013.01); *G06F 3/041* (2013.01); *G06F 2203/04806* (2013.01); *G06F 3/04817* (2013.01)

(58) Field of Classification Search
None
See application file for complete search history.

(56) References Cited

U.S. PATENT DOCUMENTS

| 4,914,568 A | 4/1990 | Kodosky et al. |
| 5,237,691 A | 8/1993 | Robinson et al. |
| 5,327,161 A | 7/1994 | Logan et al. |
| 5,481,741 A | 1/1996 | McKaskle et al. |

(Continued)

FOREIGN PATENT DOCUMENTS

| DE | 10158226 A1 | 5/2003 |
| EP | 0727740 A2 | 8/1996 |

OTHER PUBLICATIONS

National Instruments, LabView, Apr. 2003 edition, Part No. 320999E-01, Chapters 2 and 7.*

(Continued)

*Primary Examiner* — Matt Kim
*Assistant Examiner* — Mahelet Shiberou
(74) *Attorney, Agent, or Firm* — Meyertons Hood Kivlin Kowert & Goetzel, P.C.; Jeffrey C. Hood; Joel L. Stevens

(57) ABSTRACT

Providing zooming within a system diagram. Initially, a diagram of a system may be displayed. The diagram may include a plurality of icons representing physical components of the system. These plurality of icons may be initially displayed at a first level of magnification. User input to zoom on a first physical component in the diagram may be received. Accordingly, the first physical component may be displayed at a second level of magnification and other ones of the physical components may be displayed at a third level of magnification. The second level of magnification may be greater than the first level of magnification and the third level of magnification may be less than the first level of magnification. Alternatively, or additionally, different representations for various components of the system may be displayed in the diagram during or after the zoom.

14 Claims, 22 Drawing Sheets

(56) References Cited

U.S. PATENT DOCUMENTS

| | | |
|---|---|---|
| 5,522,022 A | 5/1996 | Rao et al. |
| 5,543,590 A | 8/1996 | Gillespie et al. |
| 5,543,591 A | 8/1996 | Gillespie et al. |
| 5,644,728 A | 7/1997 | Pillans |
| 5,764,218 A | 6/1998 | Della Bona et al. |
| 5,764,281 A | 6/1998 | Seo |
| 5,825,352 A | 10/1998 | Bisset et al. |
| 5,844,415 A | 12/1998 | Gershenfeld et al. |
| 5,880,411 A | 3/1999 | Gillespie et al. |
| 5,880,717 A | 3/1999 | Chan et al. |
| 5,914,610 A | 6/1999 | Gershenfeld et al. |
| 5,936,412 A | 8/1999 | Gershenfeld et al. |
| 5,943,043 A | 8/1999 | Furuhata et al. |
| 6,025,726 A | 2/2000 | Gershenfeld et al. |
| 6,028,271 A | 2/2000 | Gillespie et al. |
| 6,051,981 A | 4/2000 | Gershenfeld et al. |
| 6,066,954 A | 5/2000 | Gershenfeld et al. |
| 6,173,438 B1 | 1/2001 | Kodosky et al. |
| 6,219,628 B1 | 4/2001 | Kodosky et al. |
| 6,323,846 B1 | 11/2001 | Westerman et al. |
| 6,380,931 B1 | 4/2002 | Gillespie et al. |
| 6,396,523 B1 | 5/2002 | Segal et al. |
| 6,414,671 B1 | 7/2002 | Gillespie et al. |
| 6,526,566 B1 | 2/2003 | Austin |
| 6,610,936 B2 | 8/2003 | Gillespie et al. |
| 6,629,123 B1 | 9/2003 | Hunt |
| 6,639,584 B1 | 10/2003 | Li |
| 6,750,852 B2 | 6/2004 | Gillespie et al. |
| 6,856,259 B1 | 2/2005 | Sharp |
| 6,876,368 B2 | 4/2005 | Dove et al. |
| 6,888,536 B2 | 5/2005 | Westerman et al. |
| 6,933,929 B1 | 8/2005 | Novak |
| 6,983,227 B1 | 1/2006 | Thalhammer-Reyero |
| 7,028,222 B2 | 4/2006 | Peterson et al. |
| 7,030,860 B1 | 4/2006 | Hsu et al. |
| 7,030,861 B1 | 4/2006 | Westerman et al. |
| 7,046,230 B2 | 5/2006 | Zadesky et al. |
| 7,062,718 B2 | 6/2006 | Kodosky et al. |
| 7,109,978 B2 | 9/2006 | Gillespie et al. |
| 7,178,123 B2 | 2/2007 | Lin et al. |
| 7,180,506 B2 | 2/2007 | Lin et al. |
| 7,184,031 B2 | 2/2007 | Lin et al. |
| 7,185,287 B2 | 2/2007 | Ghercioiu et al. |
| 7,190,356 B2 | 3/2007 | Lin et al. |
| 7,200,817 B2 | 4/2007 | Dove et al. |
| 7,213,214 B2 | 5/2007 | Baar et al |
| 7,290,244 B2 | 10/2007 | Peck et al. |
| 7,312,785 B2 | 12/2007 | Tsuk et al. |
| 7,333,092 B2 | 2/2008 | Zadesky et al. |
| RE40,153 E | 3/2008 | Westerman et al. |
| 7,339,580 B2 | 3/2008 | Westerman et al. |
| 7,348,967 B2 | 3/2008 | Zadesky et al. |
| 7,358,963 B2 | 4/2008 | Low et al. |
| 7,450,113 B2 | 11/2008 | Gillespie et al. |
| 7,469,381 B2 | 12/2008 | Ording |
| 7,477,268 B2 | 1/2009 | Venolia |
| 7,479,949 B2 | 1/2009 | Jobs et al. |
| 7,493,570 B2 | 2/2009 | Bobbin et al. |
| 7,495,659 B2 | 2/2009 | Marriott et al. |
| 7,499,040 B2 | 3/2009 | Zadesky et al. |
| 7,509,588 B2 | 3/2009 | Van Os et al. |
| 7,532,205 B2 | 5/2009 | Gillespie et al. |
| 7,552,398 B2 | 6/2009 | Bier et al. |
| 7,564,449 B2 | 7/2009 | Layton et al. |
| 7,576,732 B2 | 8/2009 | Lii |
| 7,603,632 B1 * | 10/2009 | Aamodt et al. ............... 715/853 |
| 7,701,447 B2 | 4/2010 | Lii et al. |
| 7,719,523 B2 | 5/2010 | Hillis |
| 7,728,821 B2 | 6/2010 | Hillis et al. |
| 7,760,187 B2 | 7/2010 | Kennedy |
| 7,770,136 B2 | 8/2010 | Beeck et al. |
| 7,804,490 B2 | 9/2010 | Chien et al. |
| 7,812,826 B2 | 10/2010 | Ording et al. |
| 7,880,720 B2 | 2/2011 | Hill et al. |
| 7,890,257 B2 * | 2/2011 | Fyke et al. ................... 701/431 |
| 7,900,153 B2 * | 3/2011 | Damodaran et al. .......... 715/764 |
| 7,907,124 B2 | 3/2011 | Hillis et al. |
| 7,907,125 B2 | 3/2011 | Weiss et al. |
| 7,911,456 B2 | 3/2011 | Gillespie et al. |
| 8,032,843 B2 | 10/2011 | Ording et al. |
| 8,046,705 B2 | 10/2011 | Hunleth et al. |
| 8,051,148 B2 | 11/2011 | Fuller et al. |
| 2003/0035009 A1 | 2/2003 | Kodosky et al. |
| 2003/0085931 A1 | 5/2003 | Card et al. |
| 2003/0107599 A1 | 6/2003 | Fuller et al. |
| 2004/0088678 A1 * | 5/2004 | Litoiu et al. ................... 717/104 |
| 2005/0235290 A1 | 10/2005 | Jefferson et al. |
| 2005/0257195 A1 | 11/2005 | Morrow et al. |
| 2006/0026521 A1 | 2/2006 | Hotelling et al. |
| 2006/0036799 A1 | 2/2006 | Shah et al. |
| 2006/0041859 A1 | 2/2006 | Vrancic et al. |
| 2006/0095461 A1 | 5/2006 | Raymond |
| 2006/0168183 A1 | 7/2006 | Fuller et al. |
| 2007/0044030 A1 | 2/2007 | Hayles |
| 2007/0088865 A1 | 4/2007 | Breyer |
| 2007/0113185 A1 | 5/2007 | MacLeod et al. |
| 2007/0168943 A1 | 7/2007 | Marini et al. |
| 2007/0177803 A1 | 8/2007 | Elias et al. |
| 2007/0208840 A1 | 9/2007 | McConville et al. |
| 2008/0034299 A1 | 2/2008 | Hayles et al. |
| 2008/0312987 A1 * | 12/2008 | Damodaran et al. ............... 705/7 |
| 2009/0070704 A1 | 3/2009 | Ording |
| 2009/0077478 A1 * | 3/2009 | Gillingham et al. .......... 715/763 |
| 2009/0300528 A1 | 12/2009 | Stambaugh |
| 2009/0307653 A1 * | 12/2009 | Hoff .............................. 717/105 |
| 2010/0007675 A1 | 1/2010 | Kang et al. |
| 2010/0088664 A1 | 4/2010 | Khodabandehloo et al. |
| 2010/0090971 A1 | 4/2010 | Choi et al. |
| 2010/0106752 A1 | 4/2010 | Eckardt et al. |
| 2010/0169823 A1 | 7/2010 | Audet |
| 2010/0188473 A1 | 7/2010 | King et al. |
| 2010/0194784 A1 * | 8/2010 | Hoff et al. ...................... 345/661 |
| 2010/0251158 A1 | 9/2010 | Geppert et al. |
| 2010/0325571 A1 | 12/2010 | Kodosky et al. |
| 2011/0085016 A1 | 4/2011 | Kristiansen et al. |
| 2011/0261057 A1 | 10/2011 | Freyhult et al. |
| 2011/0302527 A1 * | 12/2011 | Chen et al. ..................... 715/800 |

OTHER PUBLICATIONS

Julie Larson-Green, "Previewing 'Windows 8'," Microsoft News Center, Jun. 1, 2011, http://www.microsoft.com/Presspass/Features/2011/jun11/06-01corporatenews.aspx, 2 pages. [Retrieved Dec. 5, 2011].

Sarkar, Manojit; Reiss, Steven P.; "Manipulating Screen Space with 'StretchTools': Visualizing Large Structure on Small Screen;" Sep. 1992, Brown University Department of Computer Science; p. 1-9.

Rathbone, Andy, "Windows 95 for Dummies," 1997, IDG Books Worldwide, Inc., 2nd Edition, pp. 20-22, 210-215, 220-231.

Sarkar et al., "Stretching the Rubber Sheet: A Metaphor for Viewing Large Layouts on Small Screens," Sep. 1993, Brown University Department of Computer Science, p. 1-11.

Helfman et al., "Image Representations for Accessing and Organizing Web Information," Jan. 20, 2001, Proceedings of SPIE vol. 4311: Internet Imaging II, retrieved from <http://citeseerx.ist.psu.edu/viewdoc/summary?doi=10.1.1.6.5923> on Jan. 28, 2013, pp. 91-101.

Schaffer et al., "Navigating Hierarchically Clustered Networks Through Fisheye and Full-Zoom Methods", Jun. 1996, ACM Transactions on Computer-Human Interaction, vol. 3, No. 2, pp. 162-188.

Holmquist, Lars Erik; "Flip Zooming: An Alternative to Distortion Based Focus+Context Views;" Master's Thesis, Computing Science, Goteborg University, 1996, retrieved from <http://citeseerx.ist.psu.edu/viewdoc/summary?doi=10.1.1.23.3038> on Jan. 28, 2013; pp. 1-37.

Holmquist, Lars Erik; Ahlberg, Christopher; "The Zoom Browser: Presenting a Focus+Context View of World Wide Web Documents;" 1999, pp. 1-8.

Holmquist, Lars Erik; "Focus+Context Visualization with Flip Zooming and the Zoom Browser;" Mar. 1997, Proceedings of ACM CHI '97 Conference on Human Factors in Computing Systems, Extended Abstracts, p. 263-264.

(56) References Cited

OTHER PUBLICATIONS

Dan Rodney's List of Mac OS X Multi-Touch Gestures, Mac Central archive date Nov. 13, 2009, retrieved from <http://web.archive.org/web/20091113062920/http://www.danrodney.com/mac/multitouch.html> on Feb. 20, 2013, 3 pages.

International Search Report and Written Opinion in Application No. PCT/US2011/027141, dated May 26, 2011, 14 pages.

"MyGesture Editor: Gesture Mapping," FingerWorks, retrieved from <http://www.fingerworks.com/MyGestureEditor_mapping.html> on Aug. 1, 2009; 5 pages.

"LiveQuartz 1.8 (Free Image Editor) Adds Multi-Touch Support;" Softpedia, Apr. 21, 2008, retrieved from <http://news.softpedia.com/news/LiveQuartz-1-8-Free-Image-Editor-Adds-Multi-Touch-Support-83906.shtml> on Jan. 28, 2013; 2 pages.

Han, Jefferson Y.; "Low-cost multi-touch sensing through frustrated total internal reflection;" Proceedings of the 18th Annual ACM Symposium on user interface software and technology; Oct. 23-27, 2005; pp. 115-118.

Jeronimo Barbosa da Costa, "Multi-Touch Pure Data," 2009, 4 pages.

J. Logan Olson "Multi-Touch Graphing and Flowcharts" video available at www.vimeo/8398577 Dec. 26, 2009.

Reinhard, "An Improved Fisheye Zoom Algorithm for Visualizing and Editing Hierarchical Models," 2007, IEEE, Second International Workshop on Requirements Engineering Visualization, pp. 1-10.

You et al., "A Usability Evaluation of Web Map Zoom and Pan Functions," 2007, International Journal of Design, vol. 1, No. 1, pp. 15-25.

Wesson et al., "A ZoomTree Interface for Searching Genealogical Information", 2004, ACM, Inc., pp. 131-136.

* cited by examiner

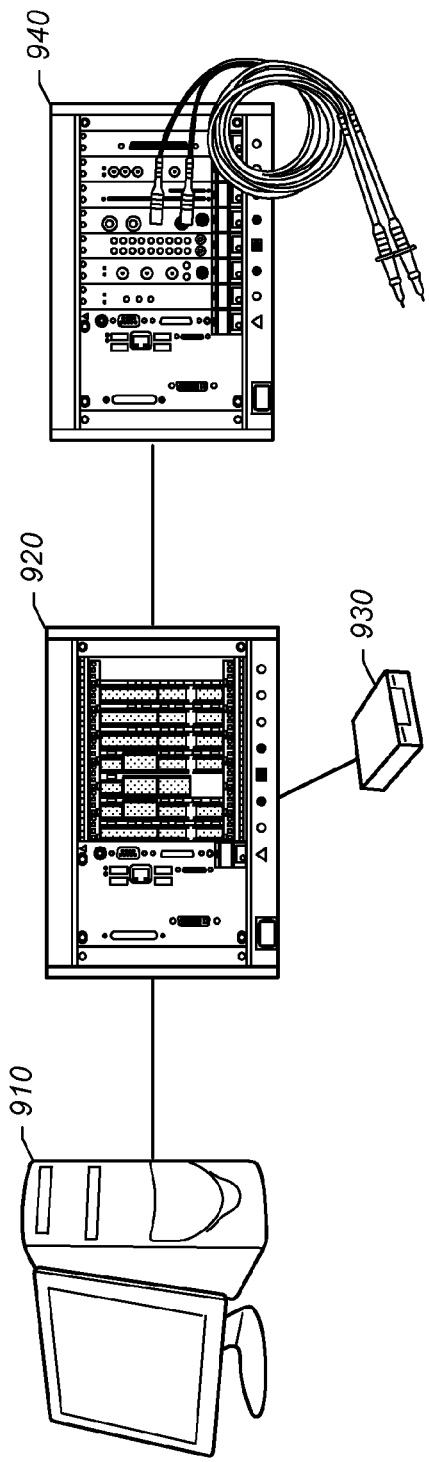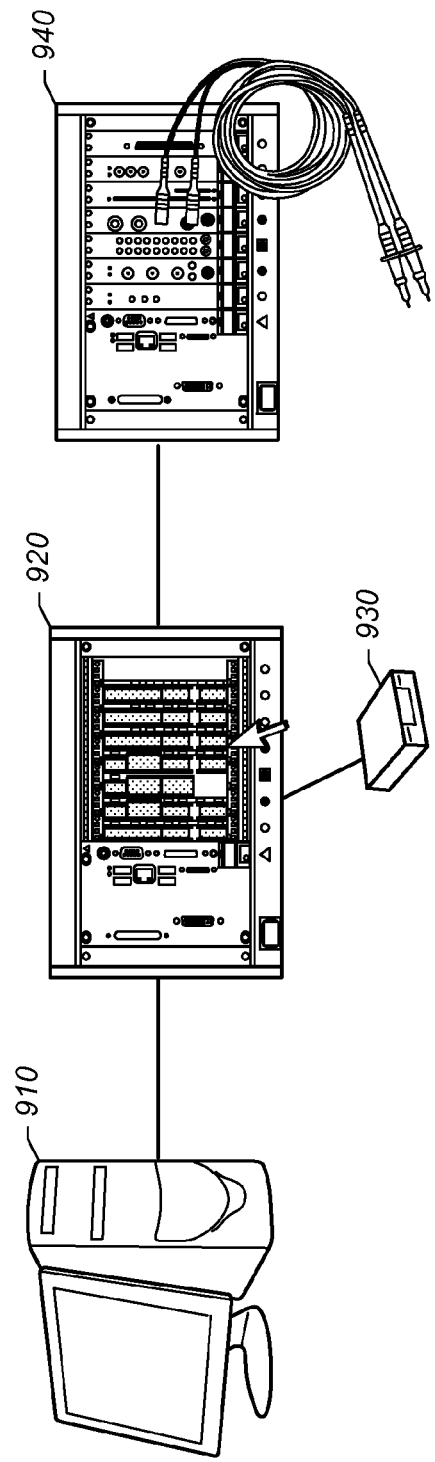

SEMANTIC ZOOM WITHIN A DIAGRAM OF A SYSTEM

FIELD OF THE INVENTION

The present invention relates to the field of diagrams, and more particularly to a system and method for providing zooming within a diagram of a system.

DESCRIPTION OF THE RELATED ART

Currently, many engineers design and use systems involving many different devices. Additionally, these different devices typically run or are configured according to disparate software programs that are deployed on or among the multiple different devices. Accordingly, it is difficult for a designer or user of a system to fully understand all of hardware, physical interconnections, software, and software interconnections of the system in an intuitive manner. Thus, improvements in understanding and designing systems are desired.

SUMMARY OF THE INVENTION

Various embodiments of a system and method for providing zooming within a diagram of a system.

Initially, a diagram of a system may be displayed. The diagram may include a plurality of interconnected icons representing components of the system. A first subset of the icons may represent physical components (e.g., devices or components within devices) of the system. These physical component icons may be connected via wires which represent physical connections between the physical components. In some embodiments, the diagram may also include a second subset of icons that may represent logical (e.g., software) components of the system. The logical components may be implemented or executed on the physical components. In some embodiments, the logical component icons may be displayed within the corresponding physical component icons. For example, a software icon may be displayed within a device icon to represent that the device executes the corresponding software. Wires between the logical components may represent logical connections, e.g., over which data or signals may be conveyed between the logical components. For example, the logical connections may represent data flow between the logical components.

Each of the icons (e.g., the physical component icons) may be displayed at a respective initial level of magnification. In some embodiments, this initial level of magnification may be the same for all of the icons. However, in alternate embodiments, various ones of the icons may have different respective levels of magnification. For example, a first physical component icon may have a first level of magnification and a second physical component icon may have a second level of magnification.

User input may be received to zoom on a first position in the diagram. The first position may correspond to an icon representing a first physical component. For example, the user may wish to view more details of the first physical component, such as the software deployed on the physical component or other details, as desired.

The user input may be received via a variety of mechanisms. For example, the user input may be received via a mouse and/or keyboard (e.g., using a key combination+scroll wheel to perform the zoom), using a zoom magnification tool (e.g., a weighted zoom magnification tool) with a mouse, receiving a gesture (e.g., a touch gesture provided to a touch interface, such as a touch display), etc. The user input may be provided to an icon and/or the first position in the diagram. Alternatively, the user may select a plurality of icons as the focus of the zoom.

In some embodiments, the user input may be received in a discrete manner. For example, the user may provide the input to perform the zoom according to a single increment (e.g., by using the zoom tool once). Alternatively, the user may provide continuous input (e.g., by providing an expansion gesture that continues to expand over a time period). The manner in which the zoom is performed may vary depending on the type of input, as described below.

In response to the user input, the diagram may be updated such that the portion of the diagram at the first position is displayed at a second level of magnification that is greater than its initial level of magnification (and is therefore "zoomed" or magnified). For example, the user input may be provided to zoom in to an icon representing a first physical component and accordingly, the magnification level of the first physical component may increase from its initial level of magnification to a second, greater level of magnification. However, unlike typical zooms or magnifications, the remaining ones of the icons may not disappear from the screen. In one embodiment, all of the icons that were initially displayed at the first level of magnification may remain on the screen even though the first physical component is now displayed at a larger magnification. In order to achieve this effect, the remaining ones of the icons may be displayed at levels of magnification that are lower than their initial levels of magnification.

Where the user input is received discretely or in an incremental fashion (as opposed to a continuous fashion), the diagram may be updated immediately. For example, the diagram may be displayed at its initial state and then may change to the updated state instantly (from the user's point of view). Alternatively, there may be an animation from the initial state to the updated state.

Where the user input is received in a continuous manner, the diagram may also be updated continuously. For example, as the user begins to provide the user input, the diagram may be updated, e.g., based on the user's input. As the user continues to provide the input, the diagram may be continuously updated, e.g., until the user ceases to provide the input. In some embodiments, the rate at which the zoom is performed may depend on the rate at which the user provides the input. For example, the zoom may be performed more quickly as the user provides the input more quickly. As a specific example, the user may provide at least a portion of the input using a scroll wheel of a mouse; as the user scrolls faster or slower, the zoom may be performed (e.g., via a plurality of updates to the diagram) faster or slower, respectively. In some embodiments, this effect may appear as a "fish eye lens" effect, e.g., changing from a normal lens view to a fish eye lens view as the zoom occurs.

Alternatively, or additionally, to the weighted zoom described above, the diagram may be updated in a manner to correspond to a "semantic zoom". For the semantic zoom, if an icon representing reaches a threshold level of magnification or size, a different representation of the component may be used. For example, at a lower level of magnification, an icon corresponding to a physical component, such as a device, may be represented as a picture of the device. However, after reaching a threshold level of size (e.g., during or after the zoom), the icon may be represented in a different manner, e.g., showing more complexity or information regarding the device. For example, the icon corresponding to the device may cease to be a picture of the device and may change into an icon with an interior portion where logical elements that are deployed on the device are shown. Alternatively, the representation may change into a hardware schematic showing the hardware components within the device. Other types of representations and changes are envisioned. For example, multiple different representations may be used (e.g., from lower to higher levels of complexity) as multiple different thresholds of magnification or size are reached.

BRIEF DESCRIPTION OF THE DRAWINGS

A better understanding of the present invention can be obtained when the following detailed description of the preferred embodiment is considered in conjunction with the following drawings, in which:

FIGS. 9A-9C and 10A-10C are exemplary Figures corresponding to the weighted and semantic zooms shown in FIGS. 7 and 8.

Figure 1:
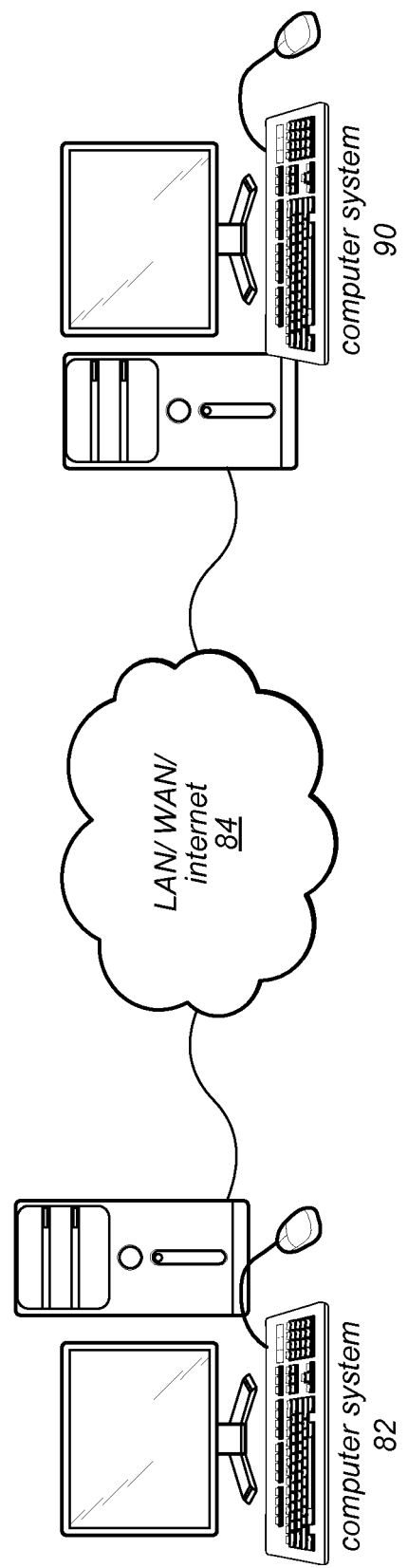
FIG. 1 illustrates a network system comprising two or more computer systems configured according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,042,469, titled "Multiple Views for a Measurement System Diagram," filed Dec. 23, 2002.

U.S. Patent Application Publication No. 2001/0020291 (Ser. No. 09/745,023) titled "System and Method for Programmatically Generating a Graphical Program in Response to Program Information," filed Dec. 20, 2000.

U.S. Patent Application Publication No. 2005/0050515 (Ser. No. 10/892,829) titled "A Graphical Program Which Executes a Timed Loop", filed Jul. 16, 2004.

U.S. patent application Ser. No. 11/462,393 titled "Asynchronous Wires in a Graphical Programming System," filed Aug. 4, 2006.

U.S. patent application Ser. No. 11/776,196, titled "Diagram That Visually Indicates Targeted Execution", filed Jul. 11, 2007, whose inventors were Jeffrey L. Kodosky, David W. Fuller III, Timothy J. Hayles, Jeffrey N. Correll, John R. Breyer, Jacob Kornerup, Darshan K. Shah, and Aljosa Vrancic.

U.S. patent application Ser. No. 12/869,270, titled "Graphically Specifying and Indicating Targeted Execution in a Graphical Program", filed Aug. 26, 2010, whose inventors were Jeffrey L. Kodosky, David W Fuller III, Timothy J. Hayles, Jeffrey N. Correll, John R. Breyer, Jacob Kornerup, Darshan K. Shah, and Aljosa Vrancic.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program"

includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-Vis), terminal nodes, structure nodes, etc. Nodes may be connected together in a graphical program by connection icons or wires. The term "logical element" may refer to a "node". For example, the term "logical element" may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc. A logical element may correspond to a software program that is executed by a processor or may correspond to a software program (or corresponding hardware configuration program) that is implemented on a programmable hardware element.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—A hardware component or device which is operable to execute software, implement code (e.g., program code), be configured according to a hardware description, etc. Processing elements include various processors and/or programmable hardware elements (e.g., field programmable gate arrays (FPGAs)), or systems that contain processors or programmable hardware elements, among others. For example, a processing element may refer to an individual processor in a computer system or the computer system itself.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

Gesture—A touch gesture or other gesture (e.g., using a mouse or other input device). For example, the user may provide a touch gesture using one or more fingers or may provide a mouse gesture using a mouse (e.g., by providing clicks or movements of the mouse while a click is depressed, among other types of mouse gestures).

As used herein, a "touch gesture" refers to a touch interaction with a touch interface. A touch gesture may include the use of one finger (or digit), two fingers (e.g., to perform two simultaneous touches), three fingers, four fingers, five fingers, etc. A touch gesture involving one touch (e.g., by a single finger or digit) may be referred to as a "single-touch gesture" and a gesture involving more than one touch (e.g., by a plurality of fingers or digits) may be referred to as a "multi-touch gesture". Generally, a touch gesture is begun by initiating a touch and is ended when the touch is no longer present (e.g., when there is no longer any touch on the touch interface or when the initial touch is no longer on the touch interface).

Exemplary touch gestures include a single touch (e.g., a "tap" with a single finger), a double touch (e.g., a "double tap" with a single finger), a two finger touch (e.g., a "tap" using two fingers simultaneously), a three finger touch, a four finger touch, a five finger touch, an expansion gesture (e.g., a "reverse pinch" or "spread" where two touches are initiated and then the distance between the two touches are increased while both remain in contact with the touch interface, although more than two touches may be used, e.g., with three touches where at least one touch moves away from the other two touches), a minimization gesture (e.g., a "pinch" where two touches are initiated and then the distance between two touches are decreased while both remain in contact with the touch interface, although more than two touches are envisioned), a "drag" or "slide" gesture using one or more touches (e.g., where a single touch is initiated, then moved some distance along the touch interface, and then released), a "flick" gesture using one or more touches (e.g., where a touch is initiated and then quickly moved along the touch interface and released), a "press" gesture (e.g., where one or more touches are initiated and then held for a threshold amount of time, longer than a tap gesture), a "press and tap" gesture (e.g., where one or more touches are "pressed" and then a second one or more touches are "tapped").

In some embodiments, gestures may include drawing or outlining. For example, a user may provide a gesture by touching the touch interface and then drawing a shape (e.g., an "L", backwards "L", a circle, a square, or any type of shape or sequence of lines). The user may create the shape using any number of simultaneous touches (e.g., using one finger, using two fingers, etc.) and each may be distinguishable from the next based on the number of touches and drawn shape. Thus, gestures may include outlines or drawings of shapes. Similar gestures can be achieved using a mouse. Generally, gestures described herein are more complex than simple single tap gestures. These gestures may be referred to as "complex gestures". Accordingly, as used herein, a "complex gesture" is any gesture other than (or more complex than) a single tap (e.g., a single touch tap). Generally, a complex touch gesture includes a single touch and additional touch input (e.g., such as another touch for a two touch tap, additional movement for a drag, increased time for a "touch and hold" gesture, etc.). Additionally, any instance of a "gesture" used herein may refer to a "complex gesture" or "complex touch gesture".

FIG. 1—Networked Computer System

FIG. 1 illustrates a system including a first computer system 82 that is coupled to a second computer system 90, where one or both of the computers are operable to execute a system diagram, e.g., a graphical program, according to embodiments of the present invention. The computer system 82 may be coupled via a network 84 (or a computer bus) to the second computer system 90. The computer systems 82 and 90 may each be any of various types, as desired, the particular types shown in FIG. 1 being exemplary only. For example, in some embodiments, the second computer 90 may be a "computer on a card" in a chassis or even installed in the first computer 82. In another embodiment, the second computer may be a programmable hardware element, such as a field programmable gate array (FPGA), or other programmable logic.

As shown in FIG. 1, the computer system 82 (and/or 90) may include a display device operable to display the system diagram, e.g., the graphical program, as the system diagram is created and/or executed. The display device may also be operable to display a graphical user interface or front panel of the system diagram during execution of the system diagram. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs (or other types of programs) that are executable to perform the methods described herein. Additionally, the memory medium may store a development environment application, e.g., a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

The network 84 can also be any of various types, including a LAN (local area network), WAN (wide area network), the Internet, or an Intranet, among others. The computer systems 82 and 90 may execute a system diagram, e.g., a graphical program, in a distributed fashion. For example, in one embodiment, computer 82 may execute a first portion of the block diagram of a graphical program and computer system 90 may execute a second portion of the block diagram of the graphical program, as will be described in more detail below. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Of course, the graphical program may be distributed in other ways as desired. For example, various portions of the block diagram of the graphical program may be targeted for execution across multiple targets or platforms.

Figure 2:
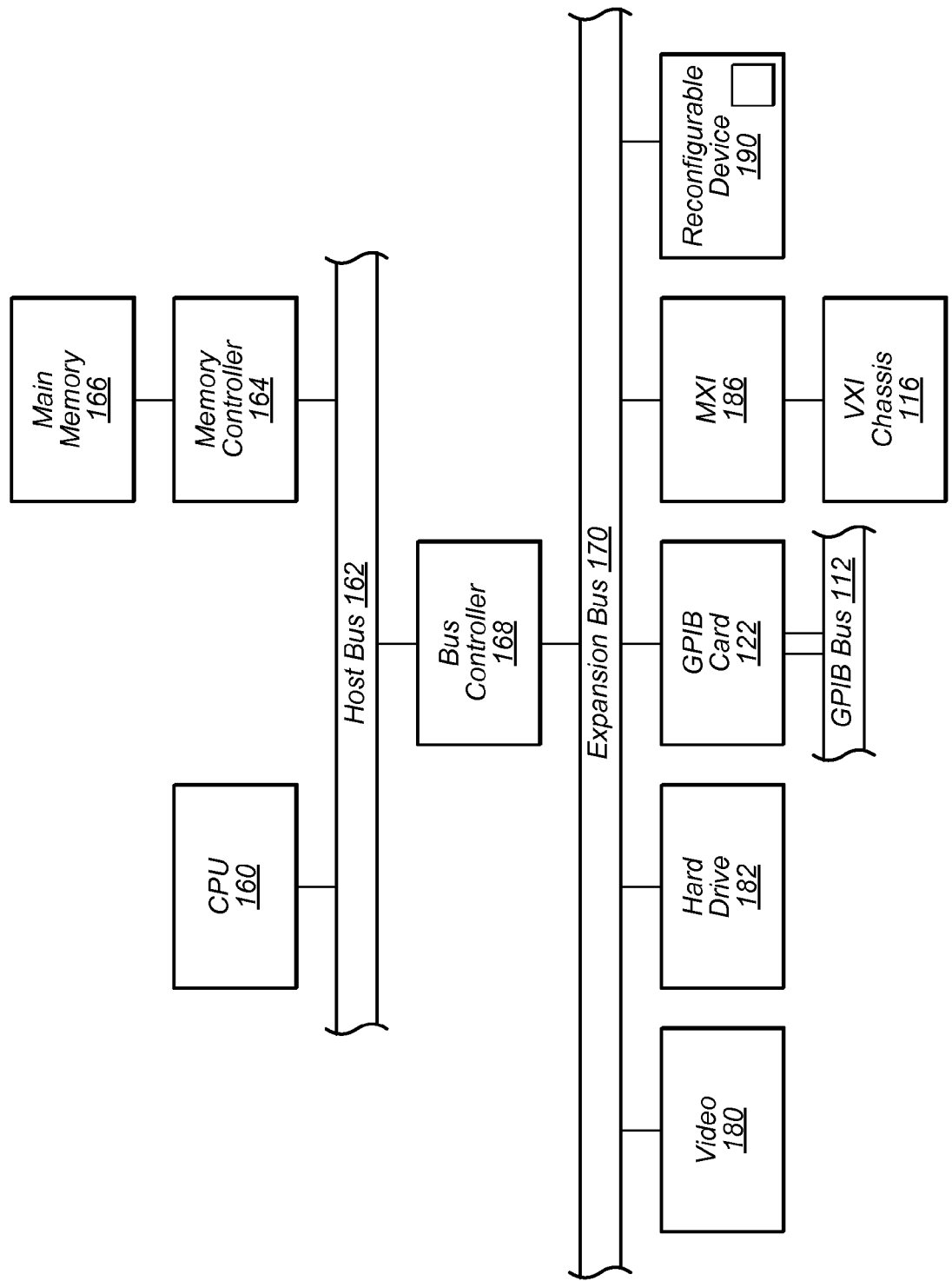
FIG. 2 is a block diagram of an exemplary computer system, according to one embodiment.
Figure 3A:
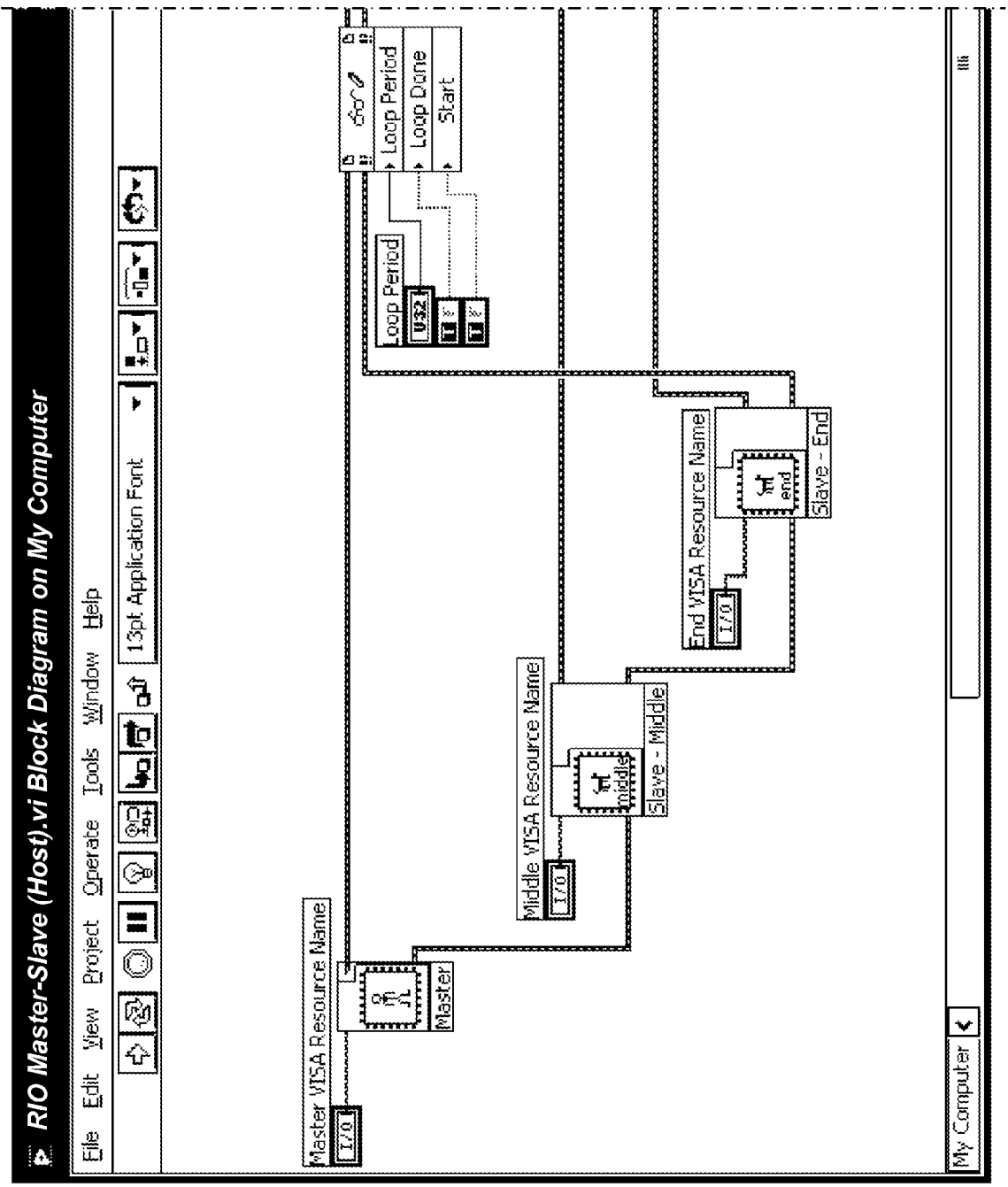
FIGS. 3A-3D are screen shots of an exemplary graphical program according to one embodiment.
Figure 3B:
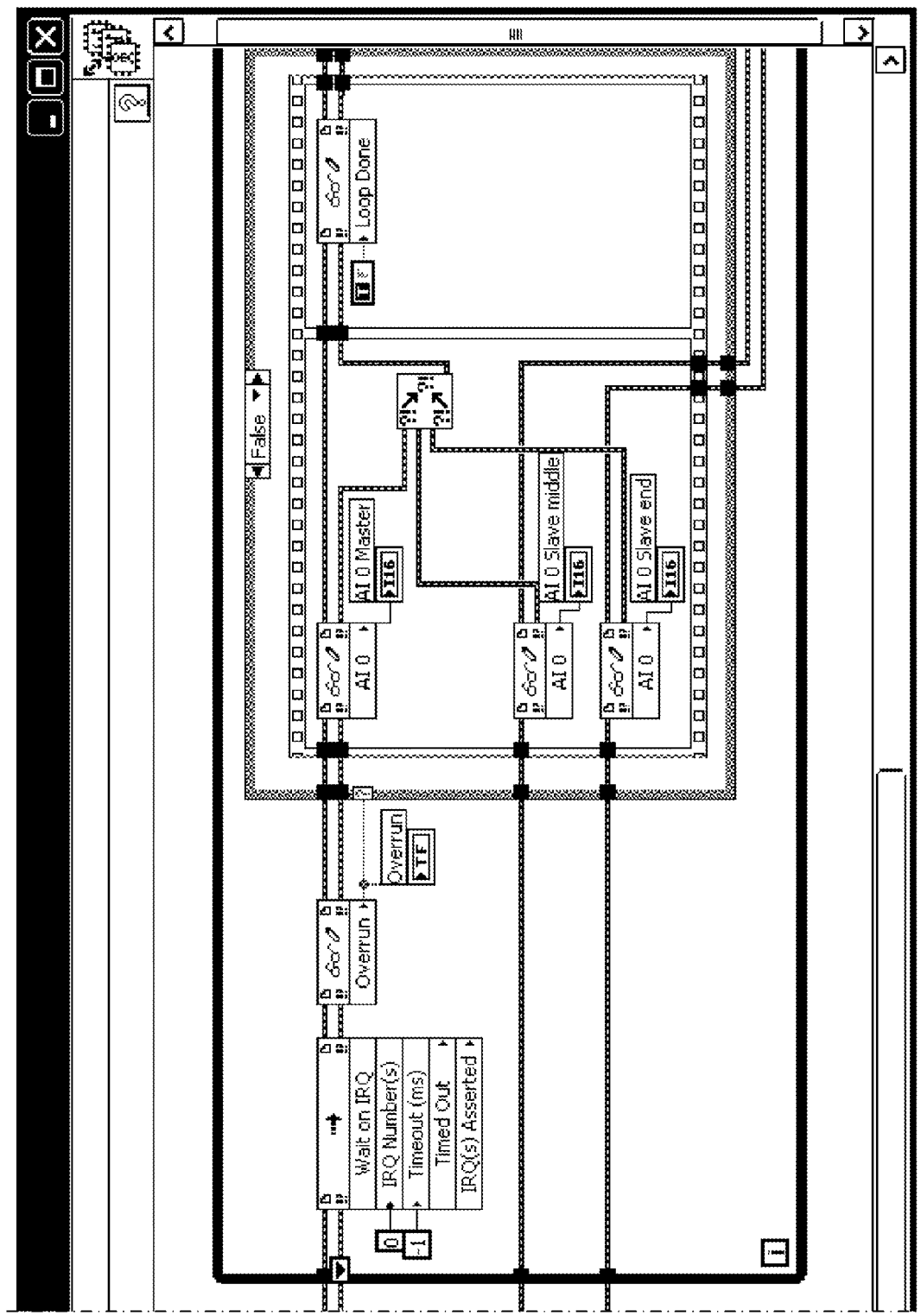
Figure 3C:
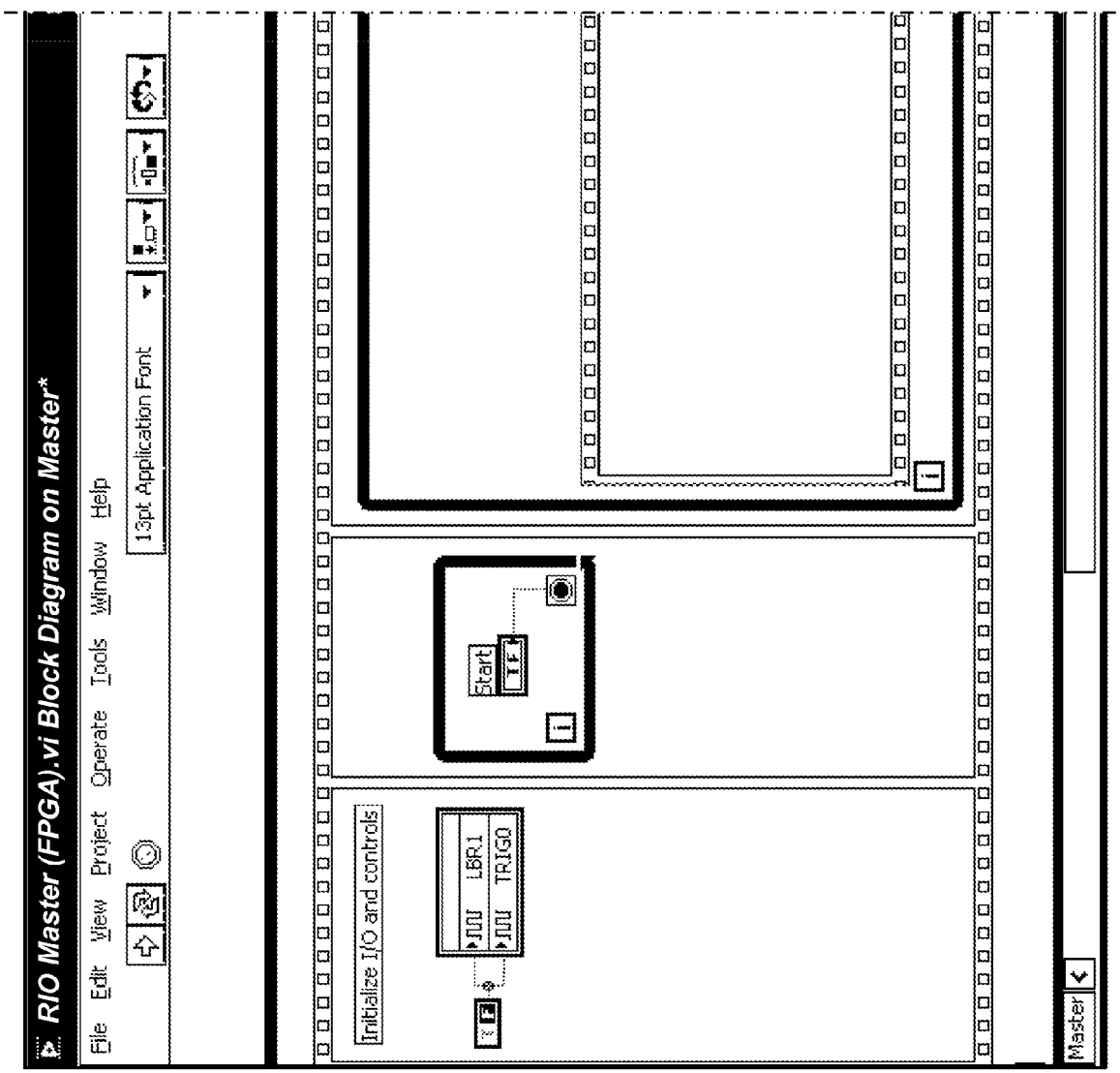
Figure 3D:
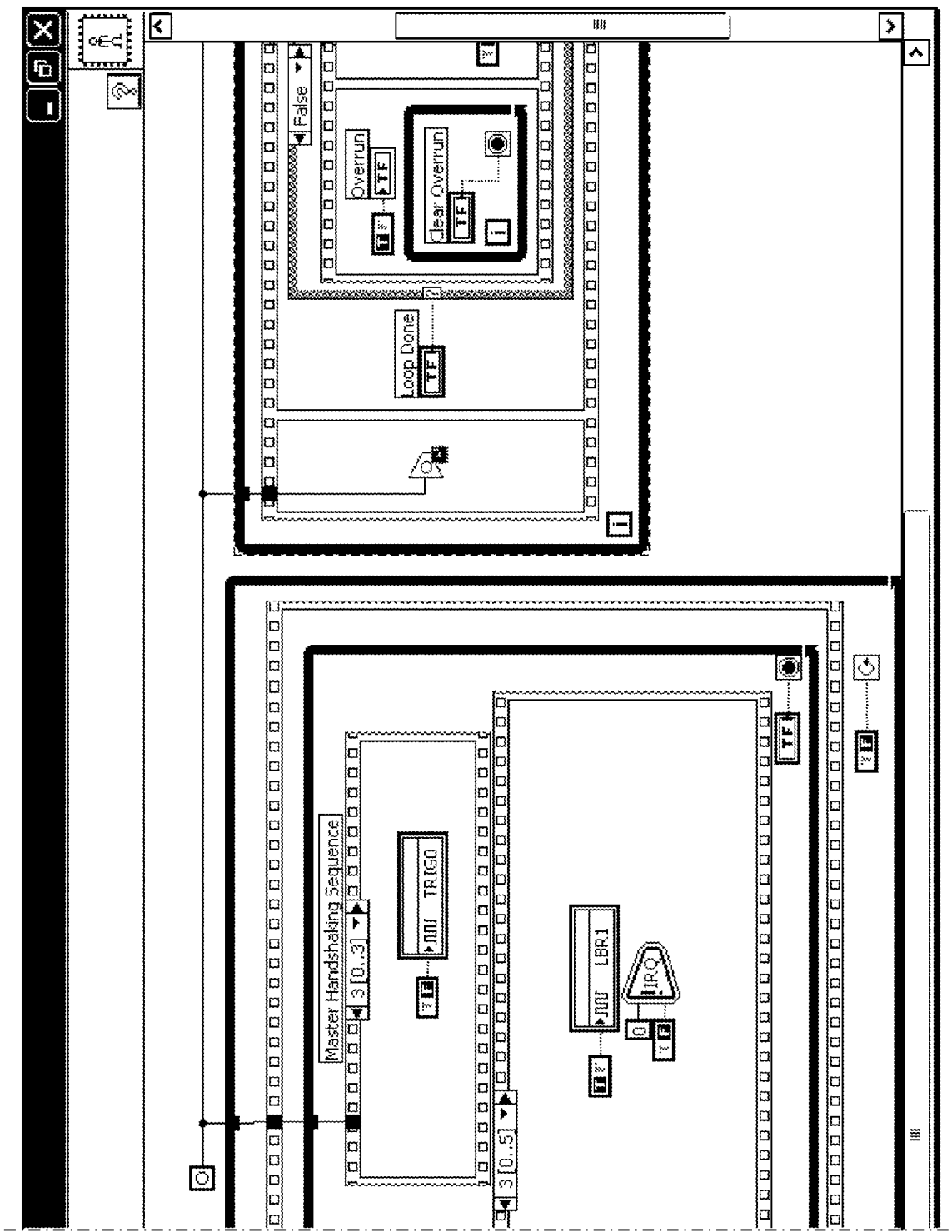

FIG. 2—Computer System Block Diagram

FIG. 2 is a block diagram representing one embodiment of the computer system 82 and/or 90 illustrated in FIG. 1, or computer system 82 shown in FIG. 2A or 2B. It is noted that any type of computer system configuration or architecture can be used as desired, and FIG. 2 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to be distributed across multiple execution targets, as well as a development environment for creating the graphical program, and for specifying its distribution over multiple execution targets. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program, or a portion of a graphical program, to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Below are described various embodiments of a method for specifying and implementing directed or distributed execution of a graphical program.

FIGS. 3A-3D—Exemplary Graphical Programs

As described above, a graphical program may include a block diagram portion and a graphical user interface portion. In some embodiments, the graphical user interface portion may be comprised within the block diagram portion. The block diagram portion may include a plurality of interconnected nodes or icons which visually indicate functionality of the graphical program. Each of the nodes may have one or more inputs and/or outputs for accepting and/or providing data to other nodes in the graphical program. Each of the nodes in the graphical program may represent software functions or executable code. In other words, the nodes in the graphical program may represent or comprise logical elements (e.g., virtual instruments (VIs), primitives, etc.).

The nodes in the graphical program may be interconnected by lines or wires which indicate that indicate that data are provided from a first node to a second node in the graphical program. In some embodiments, the wires may be connected to the terminals of nodes in the graphical program. The terminals may provide connection points for connecting the wires to a node, e.g., to individual inputs or outputs of the node. Additionally, as described herein, these wires may be configured (e.g., automatically or manually) to provide data synchronously or asynchronously using various data exchange semantics and/or data transfer mechanisms (among others). In some embodiments, wires which indicate transfer of data may be referred to as data transfer wires.

In some embodiments, the graphical program may include one or more structure nodes which indicate control flow among one or more nodes in the graphical program. For example, the graphical program may include a conditional structure node (e.g., to implement conditional branching, if statements, switch statements, signal routing, etc.), a looping structure node for implementing looping among one or more nodes (e.g., while loops, do while loops, for loops, etc.), and/or other control flow nodes.

Additionally, the graphical program may visually indicate where portions of the graphical program are executed. In one embodiment, the visual indication may include a rectangular box that contains a portion of graphical code. In some embodiments, this visual indication may be referred to as a target execution node or icon. The target execution node may have an interior portion where graphical program code that is targeted for execution on a device is contained. For example, a device icon that includes an interior portion that is designed to receive graphical program code may be referred to as a target execution node. Additionally, or alternatively, this node may be referred to as a execution target structure node, as described in U.S. Provisional Ser. No. 60/869,221 and incorporated by reference above. As described in this provisional application, the target execution node may include (e.g., may reference) contextual information that allows the graphical program code to be executed on a target device.

The graphical program may be created or assembled by the user arranging on a display (e.g., of the computer system 82) a plurality of nodes or icons and then interconnecting the nodes to create the graphical program. In some embodiments, the user may select icons and/or wires from various palettes shown in a development environment on the display. In response to the user assembling the graphical program, data structures may be created and stored which represent the graphical program. As noted above, the graphical program may comprise a block diagram and may also include a user interface portion or front panel portion. Where the graphical program includes a user interface portion, the user may optionally assemble the user interface on the display. As one example, the user may use the LabVIEW development environment to create the graphical program.

In an alternate embodiment, the graphical program may be created by the user creating or specifying a prototype, followed by automatic creation of the graphical program from the prototype. This functionality is described in U.S. patent application Ser. No. 09/587,682 titled "System and Method for Automatically Generating a Graphical Program to Perform an Image Processing Algorithm", which was incorporated by reference in its entirety above. Further descriptions regarding automatic creation of graphical programs can be found in U.S. Patent Application Publication No. 2001/0020291 which was also incorporated by reference above. Thus, the graphical program may be created in other manners, either manually (by the user) or automatically, as desired. The graphical program may implement a measurement function that is desired to be performed by one or more devices or instruments (e.g., indicated by target execution icons). In other embodiments, the graphical program may implement other types of functions, e.g., control, automation, simulation, and so forth, as desired.

FIGS. 3A-3D illustrate exemplary portions of a graphical program according to one embodiment. As shown, the graphical program includes a plurality of interconnected nodes which visually indicates functionality of the graphical program.

Thus, the plurality of interconnected nodes may visually indicate functionality of the graphical program. In other words, during execution of the graphical program, the functionality represented by the plurality of interconnected nodes may be performed.

FIGS. 4A-4G—Exemplary System Diagrams

A system diagram may refer to a diagram comprising one or more device icons and graphical program code, wherein the device icons are use to specify and/or visually indicate where different portions of graphical program code are deployed/executed. A system diagram may include icons or nodes that are connected by lines or wires, e.g., device icons connected to other device icons, a first graphical code portion connected to a second graphical code portion.

In a system diagram, a first node or icon may provide data on an output and a wire may connect the output of the node to an input of a second node. Similar to descriptions above, an icon or node providing data on an output may refer to a device executing code represented by the icon or node resulting in transferal of data to between or among the software representing the nodes. Note that the program code or functions represented by the icons may be executing on one device or among a plurality of devices. For example, a first device may be executing code of the first node and a second device may be executing code of the second node, and data may be transferred between the devices as indicated by the nodes and/or wires connecting the nodes.

Thus, the icons (nodes) in the system diagram may represent logical elements such as, for example, software functions or virtual instruments. Similar to the graphical programs described above, graphical indications may be displayed on the diagram which visually indicate where code represented by the various icons execute. For example, target execution icons may visually outline one or more of the icons and indicate that software represented by those icons execute on a specified target or device. Thus, a target execution icon may include one or more icons or nodes (e.g., in the interior portion of the target execution icon) and may indicate where the one or more icons or nodes are executed. For example, where the target execution icon represents a computer system, the icons or nodes inside the target execution icon may be executed by the computer system. Note that target execution icons may be automatically populated in the system diagram based on discovery of available devices, as desired. Alternatively, the user may include target execution icons by selecting types of devices (or classes of devices) or including template target execution icons and then configuring the target execution icons.

Note that the target execution icon may be "bound" or associated with a specific device. For example, the target execution icon may refer to a single device with a known address (e.g., IP address, bus address, etc.) and that icons or nodes within the target execution icon may be executed by that specific device during execution. The user may choose the specific device by selecting the device from a list of available devices (e.g., as automatically populated or detected by the development environment). For example, the user may configure the target execution icon (e.g., as described above) to select the appropriate device. Note that when a specific device is selected for the target execution icon, the target execution icon may be automatically displayed in the diagram with resources of the specific device visually represented. For example, if a specific microprocessor is selected, the available DMA channels of the processor may be automatically displayed in or on the target execution icon. For example, one or more terminals or wires may be displayed connected to or on the target execution icon which indicate the available DMA channels of the processor. Alternatively, or additionally, the resources of the execution device may be displayed in a palette, and the user may select and associate the resources with nodes in the target execution icon. The palette may indicate whether the resources are available (e.g., by being present or active) or not available (e.g., by not being present or being "grayed out" (or otherwise indicated)). Additionally, a programmable target (one that is able to be configured) may have a visual indication of that programmability (e.g., such as by having a white or open interior portion) whereas one that is not programmable may not have such an indication (e.g., may be grayed out or a different color).

Note that in some embodiments, one or more icons or nodes may be displayed outside of target execution icons. In such embodiments, the one or more icons or nodes may be executed by a default device, system, and/or processing element. For example, nodes outside of any target execution icons (or nodes/software functions not associated with target execution icons) may be executed by a controlling computer system or other processing element. The default processing element may be referred to as the implicit context or execution device of the diagram, whereas target execution icons explicitly define the context or execution device for nodes associated therewith.

In some embodiments, the devices represented in the system (e.g., processing elements, configurable elements, and/or other devices) may be physically present in the system or may be virtual (e.g., the devices may be simulated during execution of the system diagram) as desired. Additionally, these devices may operate according to the functionality visually represented by the icons in the system diagram which represent the devices. Note that the virtual devices of the system diagram may have an underlying model which is usable (e.g., executable) to simulate behavior of a real device corresponding to the virtual device. For example, the underlying model may be a graphical program or other executable code. Alternatively, or additionally, the virtual devices may represent devices that are desired and/or required for the system (e.g., according to user input).

Additionally, as described above regarding graphical programs, one or more GUIs may be associated with the system diagram (e.g., logical or physical components of the system diagram) which may be used during execution of the system diagram. In some embodiments, the GUI(s) may be associated with the graphical program portions that are executed by the various processing elements/devices. Thus, the GUI(s) may act as a front panel to the system diagram during execution (e.g., for receiving user input and displaying information regarding various variables, functions, devices, and/or sensors (among others) that execute or operate during execution of the system diagram).

Thus, the system diagram may allow for a logical view of a system as well as indications regarding execution targets of code represented in the system diagram. Further, in some embodiments, the system diagram may also indicate physical layouts of the system (e.g., physical connectivity as well as indications regarding execution of the logical elements of the diagram). In primary embodiments, the system diagram at least includes interconnected icons representing software (e.g., graphical program code) and one or more graphical indications (e.g., target execution icons) which indicate where these logical elements execute.

Similar to the descriptions above regarding assembly of a graphical program, system diagrams may be assembled manually (e.g., where the user selects icons and connects the icons using wires) or automatically (e.g., in response to user input specifying a desired functionality), as desired. Thus, a system diagram may be assembled manually or automatically and may include logical elements, processing elements, and/or configurable elements, as desired.

Figure 4A:
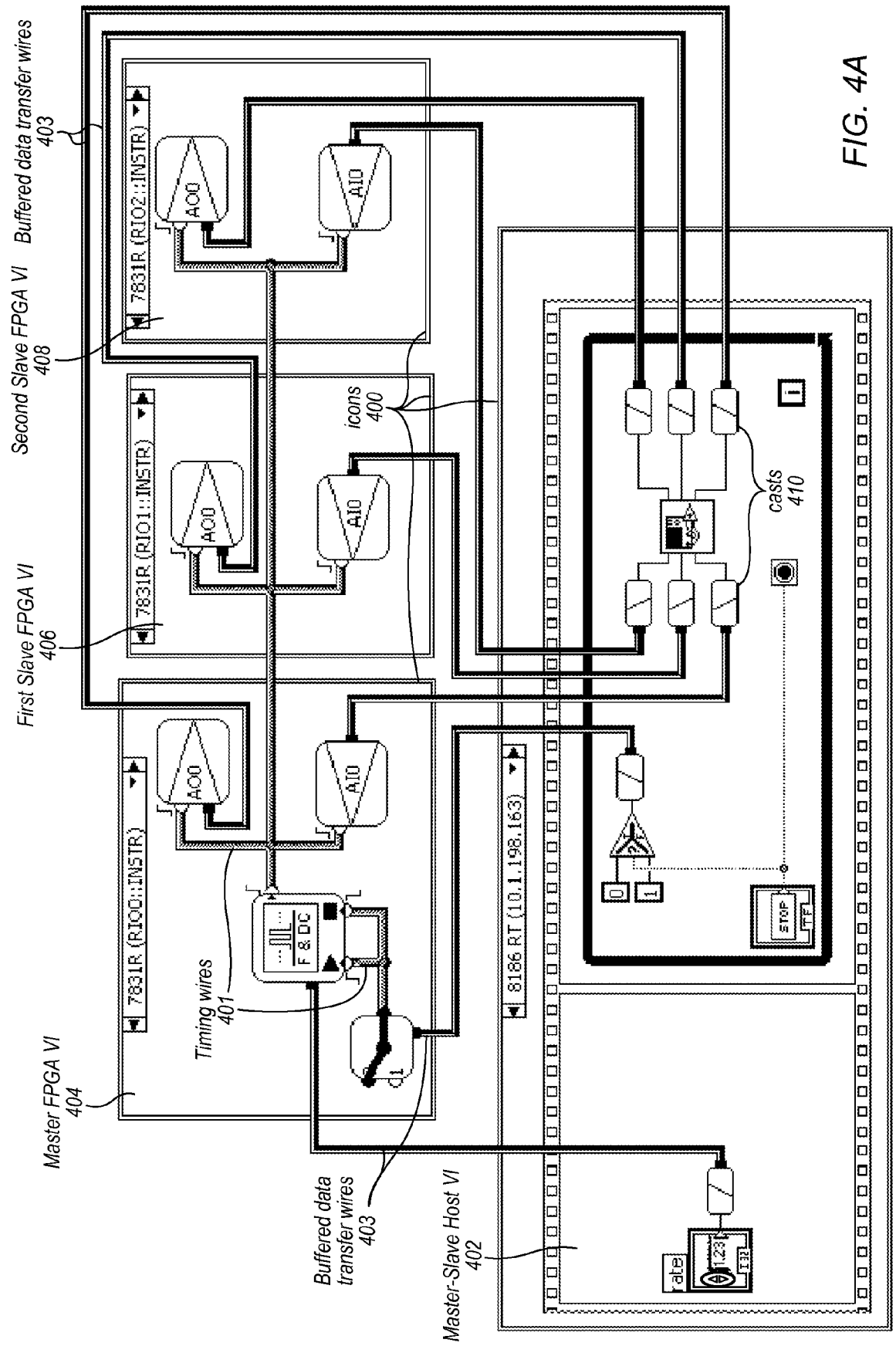
FIG. 4A is a screen shot of an exemplary system diagram which corresponds to FIGS. 3A-3D.

As shown, FIGS. 4A-4F illustrate exemplary system diagrams according to one embodiment. More specifically, FIG. 4A illustrates an exemplary system diagram which is similar to the portions of the graphical program shown in FIGS. 3A-3D. This system diagram is directed to a system that includes four different execution targets, specifically, a host computer and three FPGAs. Each of these targets is represented by a respective icon 400 (e.g., an execution target icon) that contains a respective graphical program or graphical program portion, in this embodiment, written in "G", the graphical programming language of the LabVIEW graphical development environment provided by National Instruments Corporation, and referred to as a virtual instruments (VI), although it should be noted that the "G" used may be an extended version in accordance with the techniques and features disclosed herein.

As FIG. 4A indicates, a Master-Slave Host VI 602 is shown targeted for execution on host computer (e.g., controller) "8186 RT (10.1.198.163)", as the lower "box" or icon is labeled. This host computer preferably executes a real time execution engine, such as LabVIEW RT, as the "RT" indicates. The Master-Slave Host VI is coupled to respective VIs targeted for execution on respective DAQ boards, specifically, R-Series DAQ boards, as provided by National Instruments Corporation. These three VIs are shown contained in respective icons (e.g., execution target icons), where the icon labeled "7831R (RIO0::INSTR)" contains a Master FPGA VI 404, "7831R (RIO1::INSTR)" contains a first Slave FPGA VI 406, and "7831R (RIO2::INSTR)" contains a second Slave FPGA VI 408. Thus, the icons (e.g., execution target icons) may partition the diagram into regions or portions with targeted execution.

In an exemplary application, the host process (the Master-Slave Host VI executing on host computer "8186 RT (10.1.198.163)") controls performance of data acquisition operations (reads/writes) by the three DAQ boards executing their respective VIs, e.g., stimulating and capturing responses from three units under test (UUT). In one exemplary embodiment, the execution targets may be implemented on respective PXI cards in a PXI chassis, although other implementations may be used as desired.

Additionally, as shown, the Master-Slave Host VI specifies a clock rate via the leftmost node labeled "rate", and sends this rate via a buffered data transfer wire 603 to a clock node in the Master FPGA VI (in "7831R (RIO0::INSTR)"), labeled "F & DC", which operates to generate and send a logical or Boolean clock signal (a sequence of T/F values) to respective Analog Input and Analog Output nodes in 7831R (RIO0::INSTR)", "7831R (RIO1::INSTR)", and "7831R (RIO2::INSTR)", where the Analog Input nodes are each labeled "AI0", and the Analog Output nodes are each labeled "AO0". Note that on/off control of this clock signal generation is via a switch node (shown just below and to the left of the clock node, which is itself controlled by the Master-Slave Host VI, as may be seen. As FIG. 4A shows, timing wires 401 connect the clock node to the switch node and to the Analog Input and Output nodes.

As FIG. 4A further shows, each of the Analog Input and Analog Output nodes is triggered on a rising edge of the clock signal, as indicated by rising signal edges displayed near the terminals of the nodes. On each rising edge of the clock signal, each Analog Output node may operate to receive a value from the Master-Slave Host VI and generate a corresponding analog signal that may, for example, be provided to a respective UUT. As may be seen, the Analog Output nodes are each coupled via a buffered data transfer wire 403 to a node, e.g., a function or analysis node, referred to simply as a function node for brevity, positioned in a while loop in the Master-Slave Host VI, where these three wires exit the VI on the right. Note that the while loop determines the rate that new data values are supplied to the Analog Output nodes (by the function node). The times when the Analog Output nodes consume this data and generate voltages corresponding to these data are controlled by the timing wire. If the time comes to consume a value and none is there, the Analog Output node may not produce a new voltage but rather may retain its previous output state.

Also on this rising edge of the clock signal, each Analog Input node may receive an analog signal, e.g., from the UUT, digitize the signal, and send the value (or values) to the Master-Slave Host VI. Similar to the Analog Output nodes, each Analog Input node is coupled to the function node via a respective wire, where, as may be seen, the wires enter from the top of the VI and couple to the node from the left. Thus, the function node may both control signals to be provided to the UUTs and receive (and possibly process and/or analyze) signals returned from the UUTs.

Note the (six) intervening lozenge-shaped elements 410 coupling the wires to the function node. These elements, which may be referred to as "semantic casts" or simply "casts", may operate as interfaces between nodes that operate in accordance with data flow semantics and wires that do not operate in accordance with data flow semantics. For example, in the system diagram of FIG. 7F, the wires connecting the Analog I/O nodes to the function node are buffered data transfer wires, where data placed on the wire may be stored in a temporary data structure, e.g., a FIFO, before being read from the wire. Thus, the data on or in the wire is buffered. This is in direct contrast to data flow wires, where the data placed on a wire in one cycle must be consumed (read) that same cycle. These casts may be configured to implement specified rules governing reads and writes of data on the wires. For example, in the case that the buffered data transfer wires use FIFOs, in the case where a FIFO is empty, the function node may be prevented from attempting to read from the wire, and so the cast may impose the rule that when a FIFO is empty, the while loop containing the function node may be halted until data are available again, although it should be noted that is but one example of such a rule.

Figure 4B:
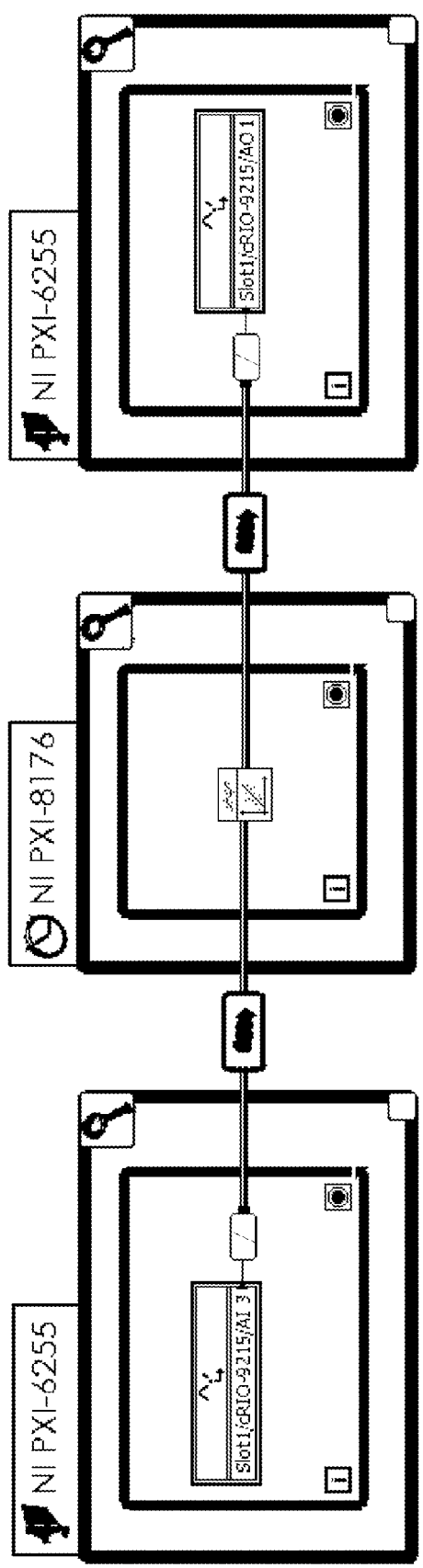
FIGS. 4B-4G are screen shots of exemplary system diagrams according to some embodiments.
Figure 4C:
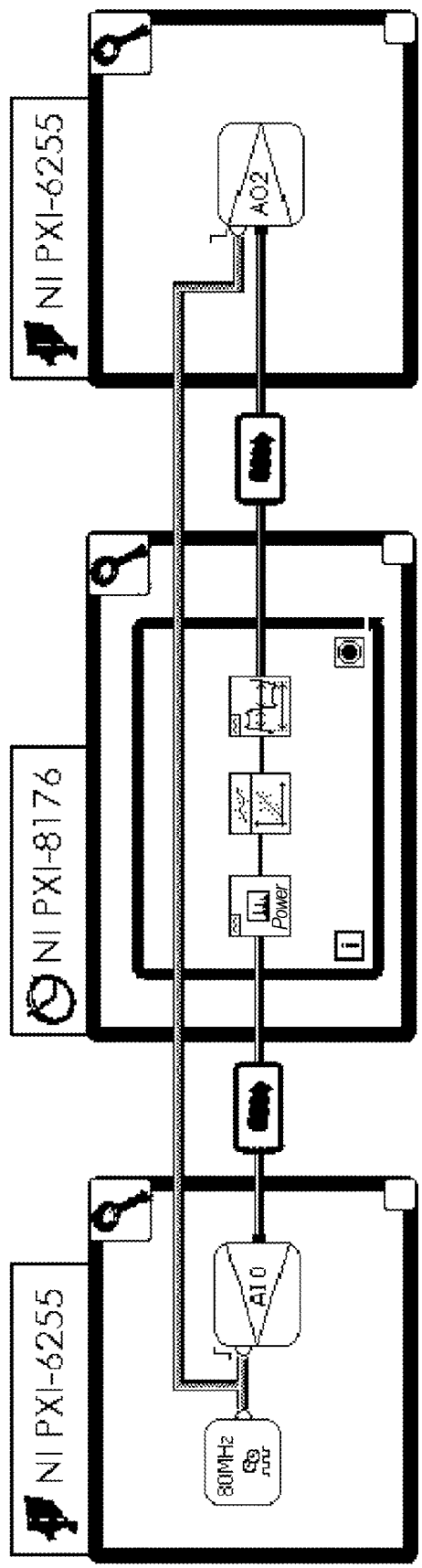
Figure 4D:
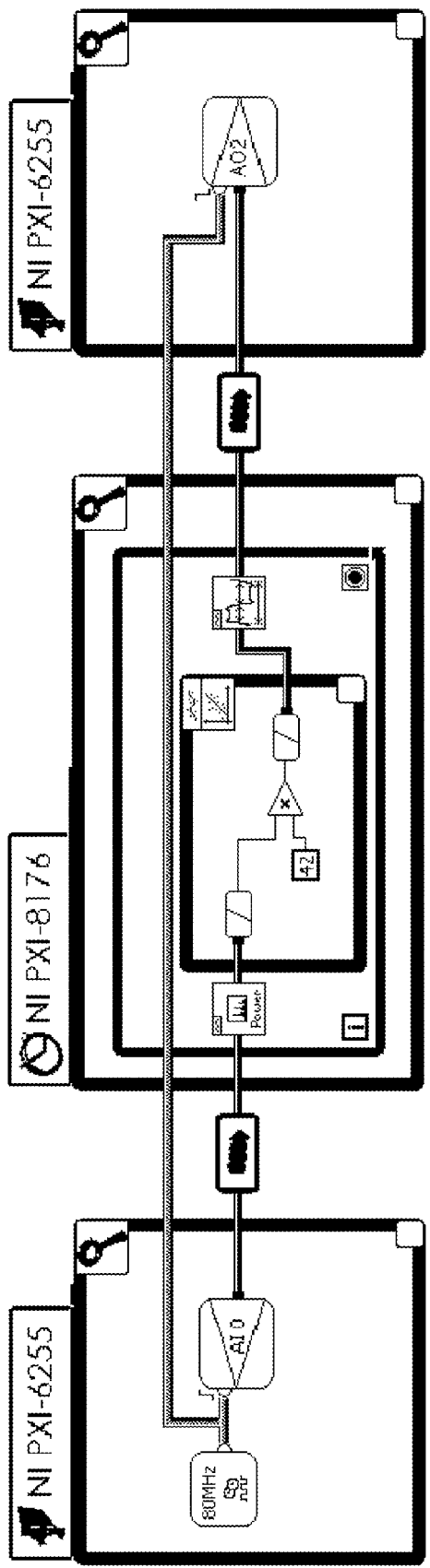
Figure 4E:
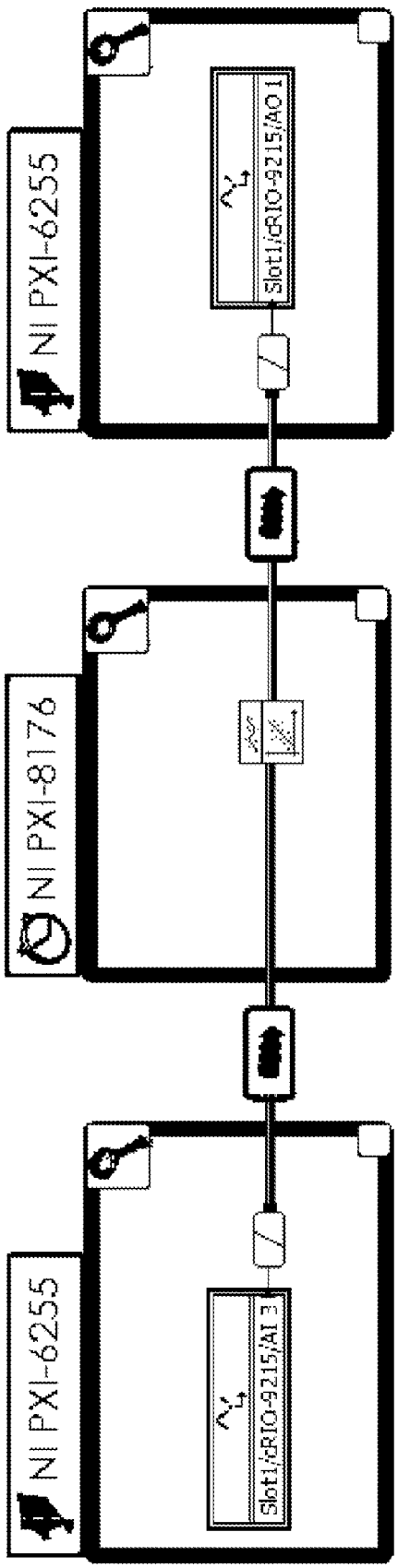

FIG. 4B illustrates an exemplary system diagram with two configurable device icons (representing the same device, NI PXI-6255) are connected to a target execution icon (representing the execution device, NI PXI-8176). As shown, each target execution icon/configurable device icon includes a single node (except for the icon in NI PXI-8176 which is displayed inside a while structure), and where the icons are interconnected by lines. The icon in each target execution icon may represent a plurality of icons which may be interconnected (e.g., the icon of the execution icon may be a VI or sub-VI). FIG. 4C illustrates an exemplary system diagram where the icons of the target execution icons are expanded, and where the ADC's in the NI PXI-6255 are connected by timing wires, and FIG. 4D illustrates an exemplary system diagram where a further sub-VI is expanded. FIG. 4E illustrates an exemplary system diagram where each target execution icon includes a single node, which, similar to FIG. 4B, may represent a plurality of icons that may be interconnected (e.g., the icon of the execution icon may be a VI or sub-VI).

More specifically, FIGS. 4B-4E illustrate system diagrams where a first device (NI PXI-6255) stores a first portion of a graphical program that represents configuration of the device for communication with a second device (NI PXI-8176). In these cases, the second device then provides data (during execution) back to the first device. Thus, FIGS. 4B-4E show both physical and logical relationships among graphical program portions executing on two devices.

Figure 4F:
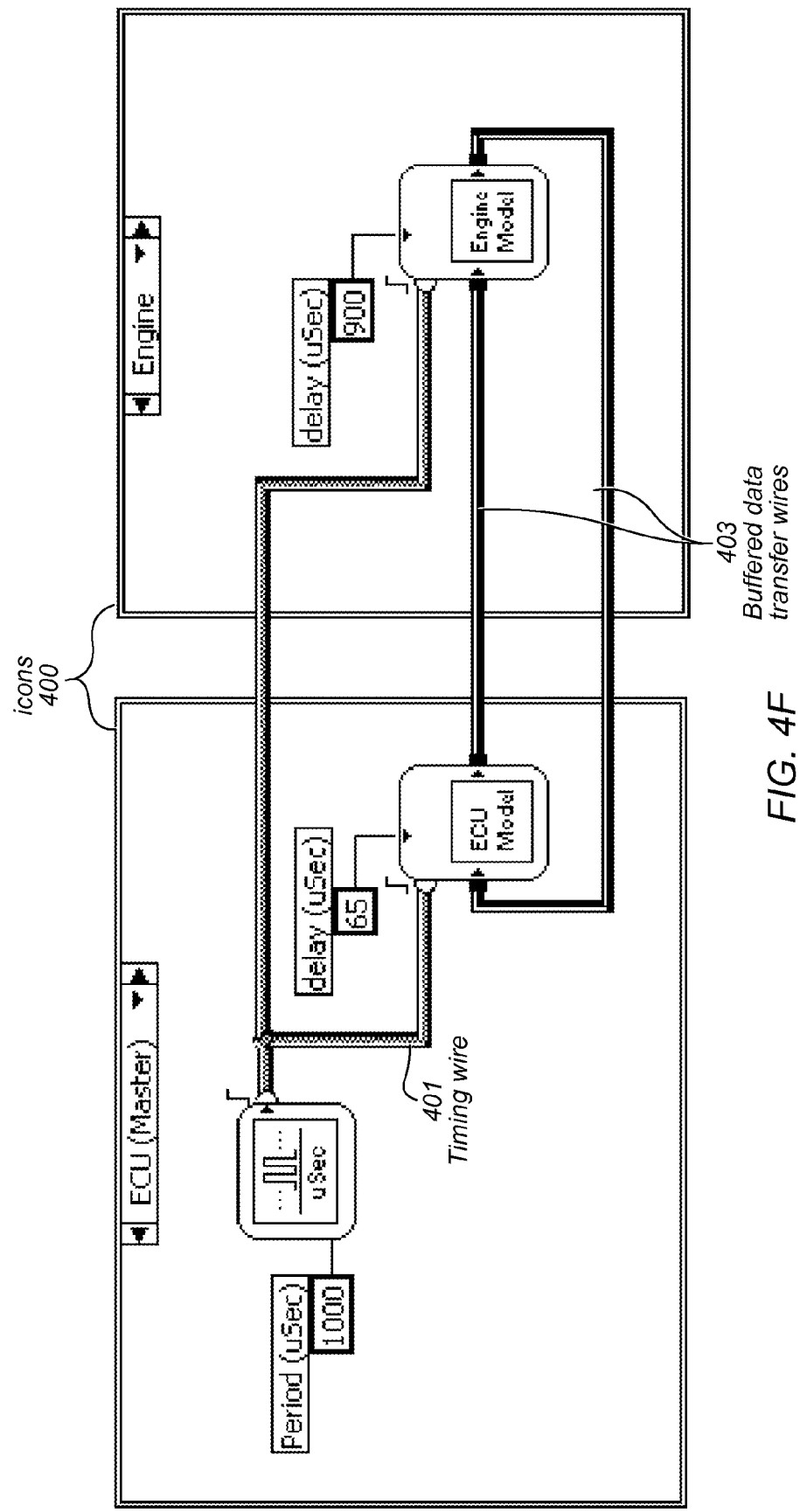

FIG. 4F is an example system diagram that is directed to a distributed modeling according to one embodiment. More specifically, the system diagram of FIG. 7F specifies or implements a system where respective models are targeted for respective execution on two execution targets, as specified by respective icons 400 (e.g., execution target icons) labeled "ECU (Master)" and "Engine".

As may be seen, the ECU (Master) icon contains a clock node, labeled uSec and displaying a clock signal symbol, which is configured to generate clock signals with a period of 1000 us (microseconds), and which may provide the clock signals to an ECU Model node, so labeled, via a timing wire (with a specified delay of 65 us) 601. The ECU Model node represents or includes an ECU model that simulates or emulates an engine control unit, e.g., for controlling an engine. The clock node represents the time-triggered network as a clock source and is used to configure the network to produce the desired cycle time. One benefit of this approach is that it may make mapping the application to another communications topology easier, i.e., modifying the application to execute on a different physical system or infrastructure than a time-triggered network. For example, one may wish to execute the application on two R Series cards plugged into the same PCI bus, or on two computers connected by an ordinary network. As another example, one may wish to run the ECU model on one core and the Engine Model on another core of a dual core CPU. Since the time-triggered app in the prior art example of FIG. 7G is so specific to running on a time-triggered network, to run that app on these other topologies, with the same timing, would require discarding most if not all of the original program and writing another one. In contrast, using the approach described herein, only the clock node has to be remapped.

As FIG. 4F also shows, the Engine icon includes an Engine Model node, so labeled, that represents or includes an engine model that simulates or emulates an engine, e.g., an internal combustion engine. Note that the clock node in the ECU (Master) icon is also coupled to the Engine Model node via a timing wire 401. The ECU Model node and the Engine Model node are connected via two buffered data transfer wires 403, thus forming a feedback loop, where the ECU Model node provides input to the Engine Model node, and the Engine Model node's output is provided back to the ECU Model node as input.

Figure 4G:
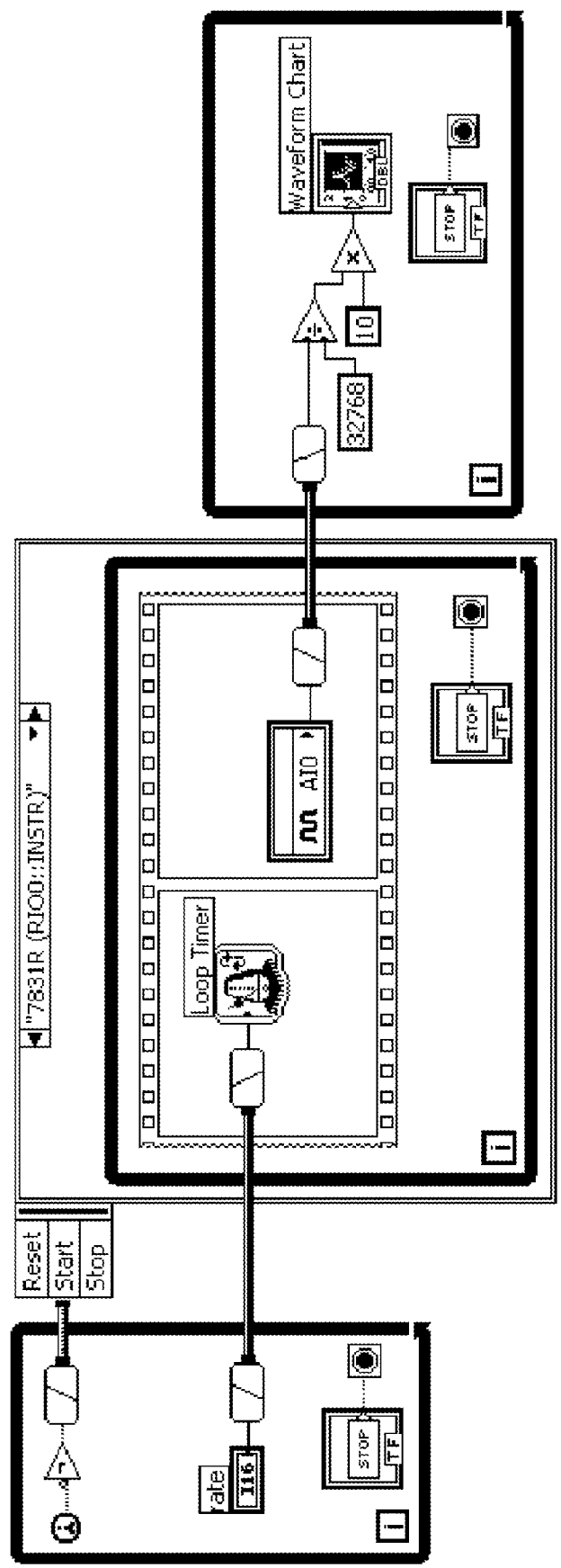

Finally, FIG. 4G illustrates a system diagram which includes dialogs for specification of procedures in the system as a whole. As shown on the target execution icon 7831R, a dialog including "Reset", "Start", and "Stop" may be displayed and may be wired to configure the respective resets, starts, and stops of the system. As shown, the 7831R device may begin execution upon receiving a signal via the wire connected to the "start" portion of the dialog. Additionally, FIG. 7G illustrates an implicit context for the graphical program portions on the left and right hand side of the system diagram. In this case, these graphical program portions may be executed by a controlling computer system.

Thus, FIGS. 4A-4G illustrate exemplary system diagrams.

Exemplary Physical Diagram

As described above, a physical diagram may refer to a diagram which indicates physical connectivity between physical devices in a system. For example, the physical diagram may visually indicate the connectivity of various physical devices in a measurement system, e.g., a computer connected to a measurement device via an Ethernet network. A physical diagram may show how executable functionality (e.g., of a graphical program or system diagram) is implemented in the real world. Thus, in primary embodiments, the physical diagram includes a plurality of interconnected icons, where each icon in the physical diagram corresponds to a physical device. Additionally, following these embodiments, connections between the icons in the physical diagram represents physical connectivity. For example, the wires between the icons in the physical diagram may represent Ethernet cables, USB connections, Firewire connections, and/or other physical media which connects devices in the system. In some embodiments, physical diagrams (and/or system diagrams) may also be useful for visualizing variable, channel, or network relationships among devices in the system. Note that a certain type of wire may also be used to represent a wireless connection.

Note that in some embodiments, configuration diagrams may have a similar appearance and/or use as physical diagrams. However, configuration diagrams may refer to diagrams which are not linked to physical reality as are physical diagrams. For example, one or more of the devices in a configuration diagram may not be physically present in the system (e.g., it may be simulated or implement on other devices in the system). Thus, physical diagrams represent physical components and physical connectivity of a system and configuration diagrams may represent physical components and/or virtual (or desired) components.

In some embodiments, the physical diagrams/configuration diagrams may be automatically populated or created by performing a discovery process. For example, the development environment may automatically discover all coupled devices as well as the connectivity between the devices. Correspondingly, all of the physical devices may be displayed in the physical diagram/configuration diagram. Discovery may include not only the connectivity and presence of devices, but also their identities, configurations, available resources, and/or other characteristics.

An exemplary physical diagram is shown in the bottom portion of FIGS. 5A and 5B (described in more detail below).

Figure 5A:
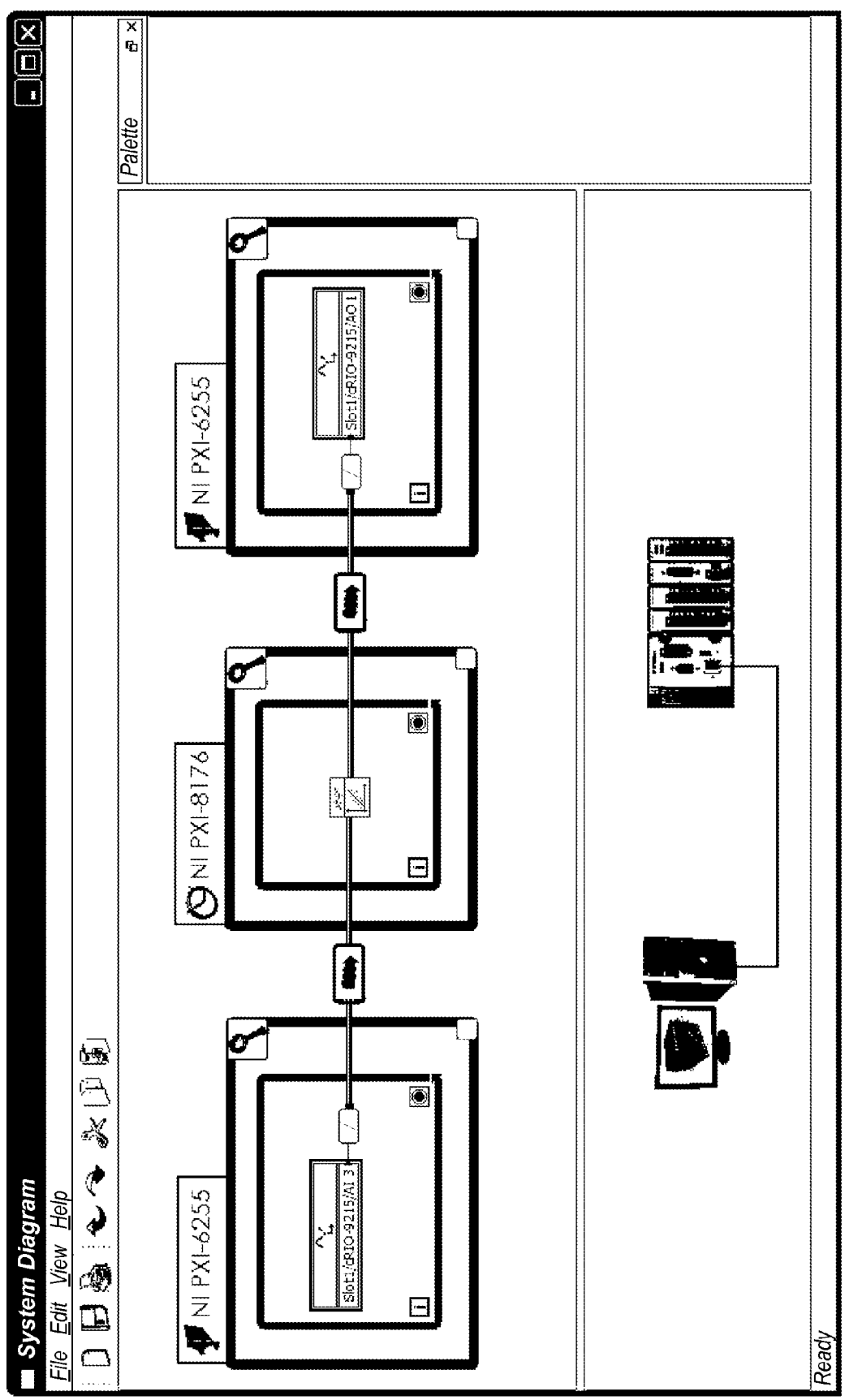
FIGS. 5A and 5B are screen shots of a split view of a system diagram and a physical diagram according to one embodiment.
Figure 5B:
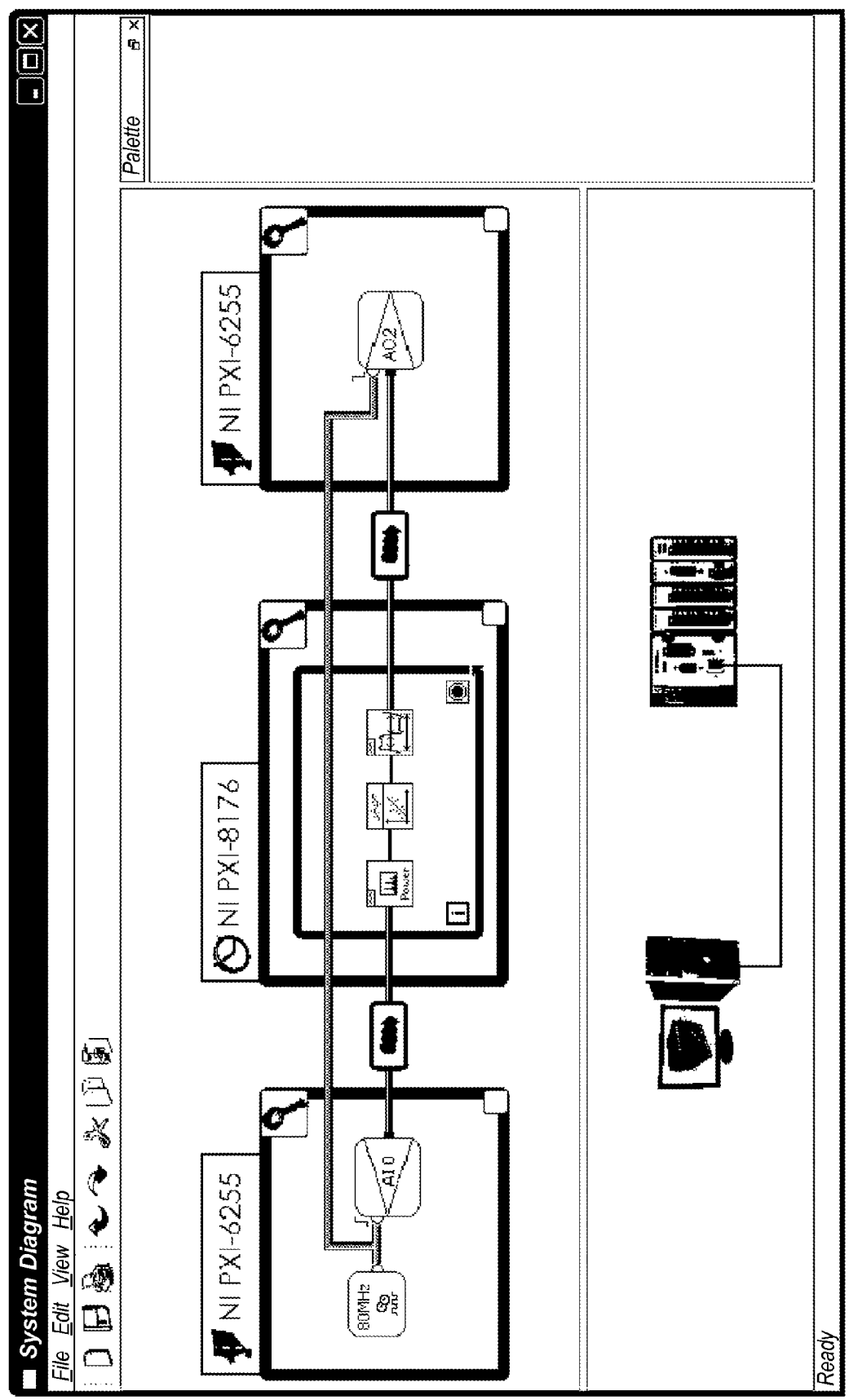

FIGS. 5A and 5B—Synergy of Multiple Diagrams

In some embodiments, it may be desirable to display or use multiple diagrams. For example, graphical programs may allow users to see a logical view of a system. Similarly, system diagrams may provide an easy and intuitive means for visualizing the logical view of a systems as well as locations of execution and relationships between other physical or virtual devices of the system. Thus, a system diagram may allow a user to easily understand functionality and logical flow of execution over an entire system. Physical diagrams and/or configuration diagrams, on the other hand, may allow users to view the physical components and connectivity of the physical components. Thus, each of the various diagrams may provide different views of a system.

In some embodiments, it may be desirable to allow a user to choose one or more of these diagrams or "views" of the system. For example, the user may want to see a purely logical view of a system. In this example, a graphical program may be displayed for the user, e.g., on the computer system 82. The graphical program may be displayed with or without graphical indications (e.g., target execution icons or configurable device icons) which visually indicate where portions of the graphical program are executed. Alternatively, the user may desire a system view of the system where both logical elements and execution indications are displayed. Additionally, the system view may include icons representing hardware devices (e.g., processing elements or configurable elements) that may not be present in the graphical programs. Finally, the user may want to view a physical representation of the system; correspondingly, the physical diagram may be displayed on the display of the computer system 82.

In some embodiments, the multiple diagrams or views may each take up the entirety of the display. Thus, the user may, in one embodiment, toggle between the different views. Alternatively, the diagrams or views may be displayed in a "split view" where a plurality of diagrams or views are shown on the display, or the different diagram are shown separately and concurrently on multiple display devices. For example, in one embodiment, a split view may be displayed where a system diagram or graphical program is displayed in a top portion and the physical view (physical diagram) may be displayed on the bottom portion. In another example, in one embodiment, a split view may be displayed where a system diagram or graphical program is displayed on a first display device and the physical view (physical diagram) may be displayed on a second display device. This may be especially useful for conveying overall system information to the user. Thus, in one embodiment, the user may see a logical view of the system which may or may not indicate where logical elements execute as well as a physical view of the system allowing intuitive understanding of the entire system in one view.

In some embodiments, the development environment may allow the user to see correlations between the logical view and the physical view. For example, following the split view embodiment from above, a user may be able to select a physical component in the physical view and corresponding graphical indications in the logical view may be visually modified to indicate where graphical program portions execute. For example, the user may select a computer system in the physical view and one or more target execution icons (or possibly icons comprised in the target execution icons themselves) may "pop" (e.g., appear to jump or bounce on the screen), change colors, become highlighted, marching ants, and/or otherwise be visually indicated. Similarly, the user may select various components in the logical view and corresponding hardware devices in the physical view may be highlighted or visually indicated. Thus, the user may easily discern which logical elements in the system diagram or graphical program correspond to the physical devices shown in the physical diagram.

Additionally, the user may be able to associate elements in the physical view with elements in the logical view or vice/versa. For example, the user may select a physical device in the physical diagram and invoke creation of an icon in the system diagram/graphical program. In one embodiment, the user may simply select one of the device and drag that device into the system diagram to invoke creation of an icon (e.g., an execution target icon or configurable device icon) in the system diagram which corresponds to that device. Alternatively, the user may select various logical elements or nodes in the system diagram and associate those icons or nodes with the devices in the physical diagram. As one example, the user may select one or more icons (e.g., a graphical program portion) in the system diagram and associate the icons with a device in the physical diagram (e.g., by dropping the icons on the device). Correspondingly, a new target execution icon or configurable icon (among others) that is associated with the device may be displayed in the system diagram with the one or more icons. Additionally, the target execution icon or configurable icon may be displayed according to connectivity of the device in the system, if desired.

As shown, FIGS. 5A and 5B illustrate exemplary split views of a system diagram and a physical diagram. Note that these Figures correspond to the system diagrams illustrated in FIGS. 4B-4E. As shown in 5A, the top portion illustrates the system diagram of FIG. 4B and the bottom portion shows the physical connectivity between the two devices of the system (in this case from a port of a chassis to a computer). More specifically, FIG. 5A depicts a data streaming application where data is read from the PXI-6255, streamed over DMA to the PXI-8176, which after modifying the data, streams data back to the PXI-6255 to be output. The FIFO affordance of the wire is used as an access point for configuring buffering policies for the configurable wire. This Figure also illustrates the concept that a single physical device (in this case the PXI-6255) can have multiple logical representations Similarly, FIG. 5B shows the same split view with an expanded system diagram (from FIG. 4C). Thus, FIGS. 5A and 5B show exemplary split views of a system diagram and physical diagram.

Figure 6A:
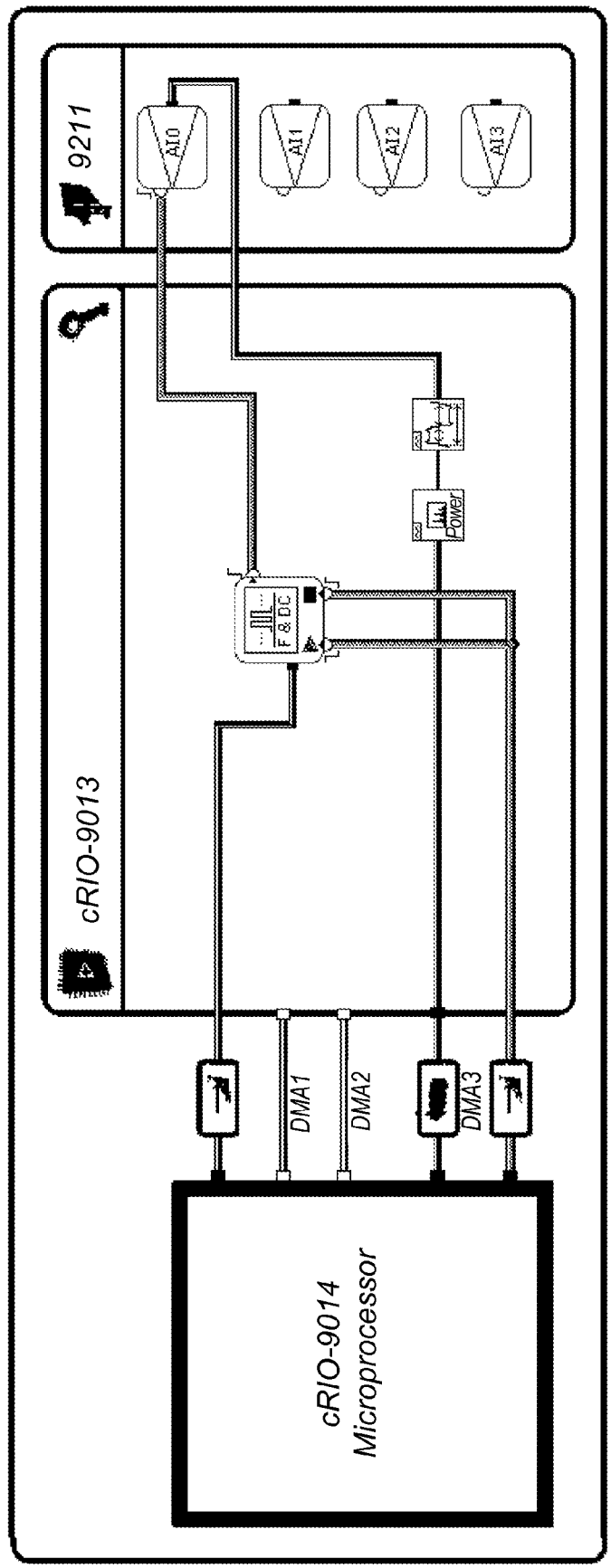
FIGS. 6A and 6B are screen shots of a composite view of a system diagram and a physical diagram according to one embodiment.
Figure 6B:
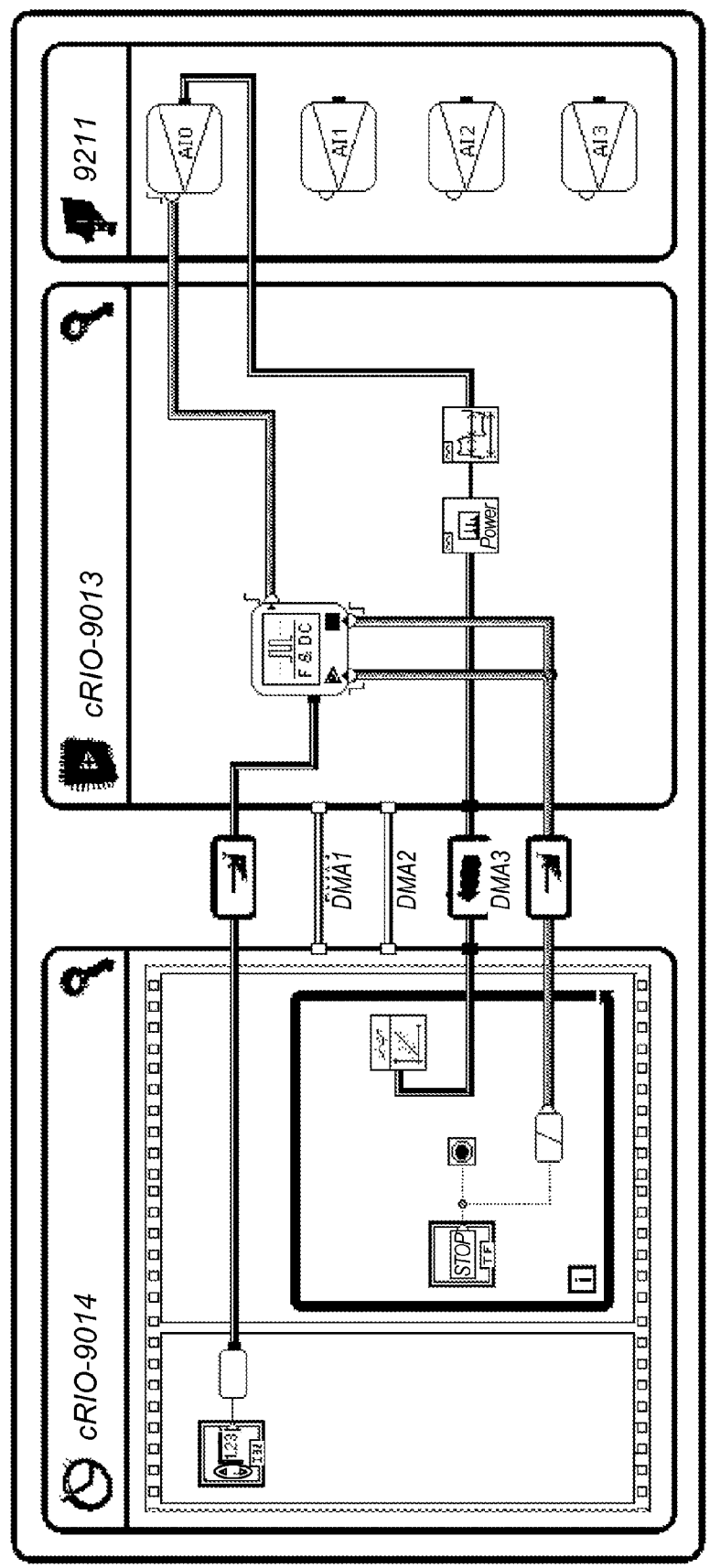

Note that the above described views are exemplary only and that other views are contemplated. For example, in some embodiments, there may be a single view, e.g., of a system diagram, where all physical and logical connectivity is indicated. Thus, in these embodiments, the user may easily understand the entirety of the system. FIGS. 6A and 6B illustrate exemplary diagrams of this case. As shown in FIG. 6A, the cRIO-9014 Microprocessor is connected to cRIO-9103 which is connected to 9211. In this case, instead of separating the logical components of the cRIO-9014 and cRIO-9103 separate target execution icons, the physical and logical relationship is shown in a single view. Similarly, FIG. 6B shows this single view, but also shows the logic of the cRIO-9014. Note that in various embodiments, the user may switch between any of the views/diagrams described above, as desired. Additionally, the user may choose to "morph" any available view to another view. For example, the user may be viewing a physical diagram of the system and may invoke a "morph" or graphical change in the diagram to a different view, such as the combined view described above. Further embodiments related to morphing or transitioning between views are described below. Alternatively, the user may invoke a conversion of the physical diagram to a logical view or system diagram, as desired. Note that these views/changes are exemplary only and that others are envisioned.

Alternatively, or additionally, more than two diagrams may be shown simultaneously. For example, two or more of a physical diagram, a configuration diagram, a system diagram, and/or a graphical program (among other diagrams) may be displayed at the same time. In some embodiments, various ones of the diagrams may be overlaid in an intelligent manner, to convey an intuitive understanding of the system to the user. For example, when two or more diagrams are overlaid, corresponding nodes or icons in the different diagrams may be shown in the same position on the display to indicate correspondence. In one embodiment, a diagram may be automatically modified to allow this correspondence to be readily displayed. Thus, the above described views are exemplary other, and other views are envisioned.

In one embodiment, one or more of the above described diagrams may be used for mapping system configurations to existing system configurations. For example, in one embodiment, the user may wish to map a diagram (e.g., containing specified physical and logical elements) to an existing (physical) system. For example, the existing diagram may have physical components (e.g., devices) which differ from the user's existing (physical) system. The development environment may be able to map the diagram (e.g., automatically) to the existing system and/or simulate the missing devices that are indicated in the diagram. Thus, diagrams may be mapped onto real systems by transferring functionality to existing systems or via simulation of the missing components (among others).

Thus, FIGS. 3A-6B illustrate exemplary diagrams/views of systems. The following sections describe configuration and display of data transfer functionality in the various diagrams described above (among others).

Figure 7:
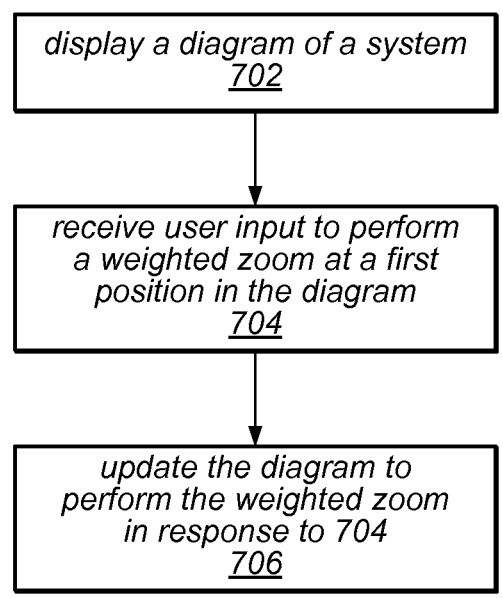
FIG. 7 is a flowchart diagram illustrating one embodiment of a method for providing weighted zoom within a system diagram.

FIG. 7—Weighted Zoom in a Diagram of a System

FIG. 7 illustrates a computer-implemented method for providing weighted zoom within a system diagram. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

Initially, in 702, a diagram of a system may be displayed. In some embodiments, the diagram may be similar to those diagrams or views described above, e.g., the system diagram. More specifically, the diagram may include a plurality of interconnected icons representing components of the system. A first subset of the icons may represent physical components (e.g., devices or components within devices) of the system. These physical component icons may be connected via wires which represent physical connections between the physical components. In some embodiments, the diagram may also include a second subset of icons that may represent logical (e.g., software) components of the system. The logical components may be implemented or executed on the physical components. In some embodiments, the logical component icons may be displayed within the corresponding physical component icons. For example, a software icon may be displayed within a device icon to represent that the device executes the corresponding software. Wires between the logical components may represent logical connections, e.g., over which data or signals may be conveyed between the logical components. For example, the logical connections may represent data flow between the logical components.

Each of the icons (e.g., the physical component icons) may be displayed at a respective initial level of magnification. In some embodiments, this initial level of magnification may be the same for all of the icons. However, in alternate embodiments, various ones of the icons may have different respective levels of magnification. For example, a first physical component icon may have a first level of magnification and a second physical component icon may have a second level of magnification.

In 704, user input may be received to zoom on a first position in the diagram. The first position may correspond to an icon representing a first physical component. More specifically, the position of the icon may be proximate to the first position. For example, the user may wish to view more details of the first physical component, such as the software deployed on the physical component or other details, as desired. The position of the icon being "proximate" to the first position may mean that the first icon overlaps with the first position, is within a few pixels or centimeters, etc. As another example, the icon is proximate to the first position if it is the nearest icon to that position or possibly the second or third nearest icon to that position. In general, the icon is proximate to the first position when the resulting zoom (in) results in an increase in magnification of the icon, e.g., to a greater extent than other icons in the diagram.

The user input may be received via a variety of mechanisms. For example, the user input may be received via a mouse and/or keyboard (e.g., using a key combination+scroll wheel to perform the zoom), using a zoom magnification tool (e.g., a weighted zoom magnification tool) with a mouse, receiving a gesture (e.g., a touch gesture provided to a touch interface, such as a touch display), etc. The user input may be provided to an icon and/or the first position in the diagram. Alternatively, the user may select a plurality of icons as the focus of the zoom, among other possibilities.

In some embodiments, the user input may be received in a discrete manner. For example, the user may provide the input to perform the zoom according to a single increment (e.g., by using the zoom tool once). Alternatively, the user may provide continuous input (e.g., by providing an expansion gesture, such as a multitouch expansion gesture, that continues to expand over a time period). The manner in which the zoom is performed may vary depending on the type of input, as described below.

In 706, in response to the user input, the diagram may be updated such that the portion of the diagram at the first position is displayed at a second level of magnification that is greater than its initial level of magnification (and is therefore "zoomed" or magnified). For example, the user input may be provided to zoom in to an icon representing a first physical component and accordingly, the magnification level of the first physical component may increase from its initial level of magnification to a second, greater level of magnification. However, unlike typical zooms or magnifications, the remaining ones of the icons may not disappear from the screen. In one embodiment, all of the icons that were initially displayed at the first level of magnification may remain on the screen even though the first physical component is now displayed at a larger magnification. In order to achieve this effect, the remaining ones of the icons may be displayed at levels of magnification that are lower than their initial levels of magnification.

Where the user input is received discretely or in an incremental fashion (as opposed to a continuous fashion), the diagram may be updated immediately. For example, the diagram may be displayed at its initial state and then may change to the updated state instantly (from the user's point of view). Said another way, the diagram may "snap" from the initial state to the updated, zoomed state in response to the user input. Alternatively, there may be an animation from the initial state to the updated state.

Where the user input is received in a continuous manner, the diagram may also be updated continuously. For example, as the user begins to provide the user input, the diagram may be updated, e.g., based on the user's input. As the user continues to provide the input, the diagram may be continuously updated, e.g., until the user ceases to provide the input. For example, a zoom animation (e.g., via a series of updates to the diagram) may be displayed while the user input is provided.

In some embodiments, the rate at which the zoom is performed may depend on the rate at which the user provides the input. For example, the zoom may be performed more quickly as the user provides the input more quickly. As a specific example, the user may provide at least a portion of the input using a scroll wheel of a mouse; as the user scrolls faster or slower, the zoom may be performed (e.g., via a plurality of updates to the diagram) faster or slower, respectively. In some embodiments, this effect may appear as a "fish eye lens" effect, e.g., changing from a normal lens view to a fish eye lens view as the zoom occurs.

In some embodiments, as the zoom occurs, the rate of change of the magnification levels may vary. For example, the rate of change may vary as a gradient from the first position in the diagram. More specifically, icons at or near the first position may have a positive rate of change and that rate of change may decrease as the position of the icons increases from the first position (e.g., the rate of change may be largest at the center and may decrease in a radial fashion). The rate of change may decrease in a continuous or discrete (e.g., stepwise) manner as a function of distance from the first position. Various different functions may be used for determining the rate of change of level of magnification.

In one embodiment, for an icon at the first position, the rate of change of increase in magnification may be greater than the rate of change of decrease in magnification for other icons that are not located at the first position. For example, an icon at the first position may have a positive rate of change of 150% per second where an icon that is not located at the first position may have a negative rate of change of 50% per second (i.e., −50% per second). Thus, in terms of absolute value, the rate of change for the icon at the first position may be greater than the rate of change for the icon located away from the first position, even though one is a positive rate and the other is a negative rate. Similar to embodiments above, these rates of change may vary depending on the distance from the first position. The rates of change may also vary according to the amount of time that has passed since the input began. For example, the rates of change may increase more quickly over time or may increase more rapidly at the beginning and slow down over time, among other possibilities.

As indicated above, various ones of the icons may be connected by wires. These wires may maintain their connectivity during the zoom process. For example, even while icons in the diagram are changing in size, the wires may dynamically move and change in size in order to maintain the visual appearance of the various components being connected in the diagram. Additionally, the visual size of the wire may increase or decrease as the level of magnification increases or decreases, respectively. In one embodiment, a wire may appear larger at an end connected to an icon with a higher level of magnification than at the other end (where it would appear smaller) that is connected to an icon with a lower level of magnification.

While the above has focused on zooming in on a particular portion of the diagram, the inverse of the above may be performed when zooming out. For example, when zooming out, the position of the zoom may receive a greater amount of decreasing level of magnification than other portions of the diagram. Thus, if 702, 704, and 706 were initially performed and then reperformed at the same position except zooming out, then the diagram would return to its initial state of 702.

Figure 8:
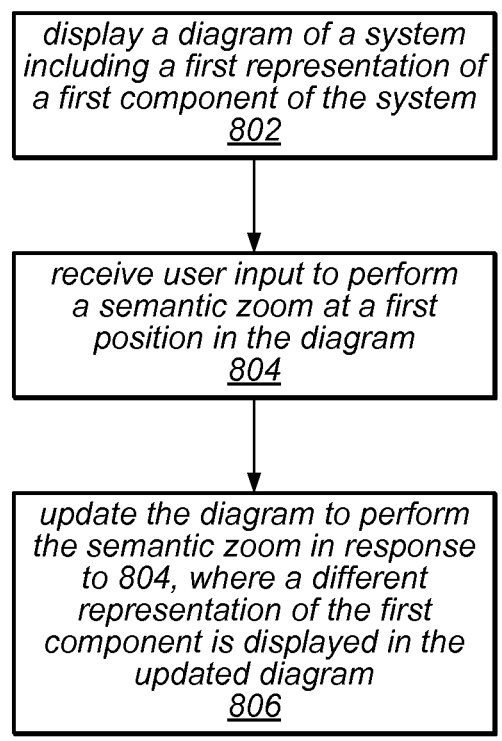
FIG. 8 is a flowchart diagram illustrating one embodiment of a method for providing semantic zoom within a system diagram.

FIG. 8—Semantic Zoom in a Diagram of a System

FIG. 8 illustrates a computer-implemented method for providing semantic zoom within a system diagram. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a diagram of a system may be displayed. The diagram of the system may be similar to the one described in 702 above. Within the diagram, icons representing components (e.g., physical components) may have the same or differing levels of magnification, as desired. Additionally, a first icon corresponding to a first component may be displayed according to a first representation, e.g., it may visually depict the first representation. For example, the first component may be initially represented via the first icon as a picture of the first component. As a specific example, the first component may be a device in the system and the first icon may be (or resemble) a picture of the device. In some embodiments, the other components in the diagram may be similarly represented by their corresponding icons, although other embodiments are envisioned where the diagram includes multiple types of representations at the same time.

In 804, user input may be received to zoom on a first position in the diagram, similar to 704 above. For example, the first icon may be at or near the first position in the diagram. For the semantic zoom of FIG. 8, the user input may specify a semantic zoom (e.g., via a gesture specific to semantic zoom, using a tool specific to semantic zoom, etc.). However, the semantic zoom may be implemented as a default zoom, may automatically occur during any zooming action, and/or may be associated with any specific type of zoom (e.g., weighted zoom), as desired. Regardless, the user input may be received similar to that described regarding 704 above.

In 806, in response to the user input, the diagram may be updated such that the portion of the diagram at the first position is displayed at a second level of magnification that is greater than the initial level of magnification (whether that level is the same for all components or different initially).

In some embodiments, as icons increase or decrease in levels of magnification (or size), the representation of the icons may change. For example, after an icon reaches a threshold level of magnification or size, the icon may change from a first representation to a second representation. The representations may correspond to different levels of complexity. Following the specific example from above, the first icon may be initially displayed at a first level of magnification. After receiving the user input above, the first icon may increase in magnification to a second level of magnification, passing a threshold level of magnification. Accordingly, after crossing over the threshold level of magnification, the representation of the first icon may change from a first, simpler representation to a second, more complex representation. As discussed above, the first icon may correspond to a first device of the system and the first representation may be a picture representation. In one embodiment, after exceeding the threshold level of magnification (or size), the first icon may change from being a picture of the first device to a different representation that is more complex, e.g., including icons representing the software deployed on the device, showing a hardware schematic of the device, etc. Note that even though an icon may change in appearance and size as it changes from one representation to another, it is still considered the same icon.

In one particular embodiment, a threshold level of magnification or size may determine whether or not logical elements are displayed for the device in the diagram. When reaching the threshold, the logical elements may be displayed or removed accordingly. Thus, in a diagram with an initial state where a first icon is displayed in a representation that does not include logical elements, as the level of magnification increases above the threshold level, the logical elements may begin to be displayed. Alternatively, in a diagram with an initial state where a first icon is displayed in a representation that does include displayed logical elements, as the level of magnification decreases below the threshold level, the logical elements may no longer be displayed. Similar embodiments apply to other representations, such as hardware schematics. In some embodiments, rather than an abrupt change, the change in representation may occur gradually, e.g., the first representation may morph into the second representation.

As indicated above, various ones of the icons may be connected by wires. Similar to descriptions provided regarding FIG. 7, these wires may maintain their connectivity during the zoom process. For example, even while icons in the diagram are changing in size, the wires may dynamically move and change in size in order to maintain the visual appearance of the various components being connected in the diagram. Additionally, some of the wires may change representations during the zoom. For example, some of the wires may represent a bundle of connections (physical and/or logical connections). Accordingly, if such wires are in a position with an increasing level of magnification, the representation may change from a single, bundled wire, to a plurality of wires. In other words, as the wire magnification is increased, the bundled wire may break out into a plurality of wires. When decreasing in magnification, the opposite effect may occur. Additionally, the visual size of the wire may increase or decrease as the level of magnification increases or decreases, respectively.

In further embodiments, the wires may change as different representations are used in the diagram. For example, at a first level of magnification logical elements associated with two different physical elements may be displayed. These logical elements may be connected via wires representing logical connections. However, during a zoom, the logical elements associated with one of the physical elements may appear or disappear, e.g., as the representation of that physical element changes upon reaching a threshold level of magnification. Accordingly, the wires representing the logical connections between the logical elements may no longer be valid (since some of the logical elements have disappeared). In some embodiments, these wires may be automatically removed or may be automatically modified such that they represent physical connections between the devices. For example, the physical connections may not have been initially represented since the wires represented logical connections. Accordingly, when the logical elements that are being connected disappear, the wire may connect the two physical elements rather than the associated logical elements (e.g., which were previously displayed within the icons representing the physical elements). In embodiments where wires are already present for the physical connections, the wires representing logical connections may simply disappear. In the inverse case, as logical elements appear, wires representing logical connections of the new logical elements may also appear. Additionally, wires representing physical connections may disappear or be replaced with wires representing logical connections as the logical elements appear. However, wires representing both logical connections and physical connections may be displayed at the same time, as desired.

Similar to descriptions regarding zooming in FIG. 7, the manner in which the zoom is performed may vary depending on the user input. For example, where the user input is received discretely or in an incremental fashion, similar to above, the diagram may be updated immediately. For example, after providing the user input, the diagram may be automatically updated to increase the level of magnification and change representations of icons in the diagram where appropriate (e.g., for all icons that are displayed and have passed the threshold level of magnification or size).

Also similar to above, where the user input is received continuously, the diagram may be updated continuously. For example, while zooming in on a portion of the diagram including the first icon, via a series of updates to the diagram, the first icon may increase in size in the first representation until the threshold level of magnification or size is reached. Upon reaching that level of magnification, the icon may change from the first representation to a second representation (e.g., including logical elements deployed on the corresponding physical component). If the user input continues, the second representation may increase in size until the user input stops or possibly until another threshold level is reached and another representation is used.

In some embodiments, while the level of magnification and size of the icon increases within the same representation, the details of that representation may increase. For example, for a picture representation, a lower resolution image may be used initially, but as the level of magnification increases the resolution may increase and more details may be visible to the user. As another example, for a representation that includes logical elements, the logical elements may be initially displayed as simple blocks (e.g., representing entire graphical programs), but these blocks may change in to their corresponding graphical programs as the size increases. Thus, even within a representation, more details may be added as the size or level of magnification increases.

While the above is described with respect to components displayed in the diagram, similar descriptions apply to the wires in the diagram. Additionally, similar to above, while the method of FIG. 8 is described with respect to zooming in to a specific position in the diagram, zooming out may be performed in a similar, but inverse, fashion. For example, representations having decreasing levels of complexity may be used while zooming out, e.g., a more complex representation may be used until the level of magnification decreases past the threshold and then a simpler representation may be used.

The methods of FIGS. 7 and 8 (weighted zoom and semantic zoom) may used individually or combined as desired. For example, the user may be able to provide user input to perform only weighted zoom, only semantic zoom, only other types of zoom (e.g., a "normal" zoom), or any combination of the above. In some embodiments, one or more of these effects may be built in to the default zoom effect. For example, the default zoom may automatically incorporate features of the semantic zoom and/or weighted zoom described above. In one embodiment, the weighted zoom and semantic zoom may be performed concurrently. Thus, the combined zoom may operate as described in FIG. 7 and may also change representations at one or more different threshold levels of magnification or size, as described in FIG. 8. Additionally, the weighted zoom and/or semantic zoom may incorporate some, but not all, of the features of the other zoom. For example, the descriptions regarding wires and their representations may apply to the weighted zoom of FIG. 7 as well as the semantic zoom of FIG. 8.

FIGS. 9A-9C and 10A-10C—Exemplary Weighted and Semantic Zooms

Figure 9C:
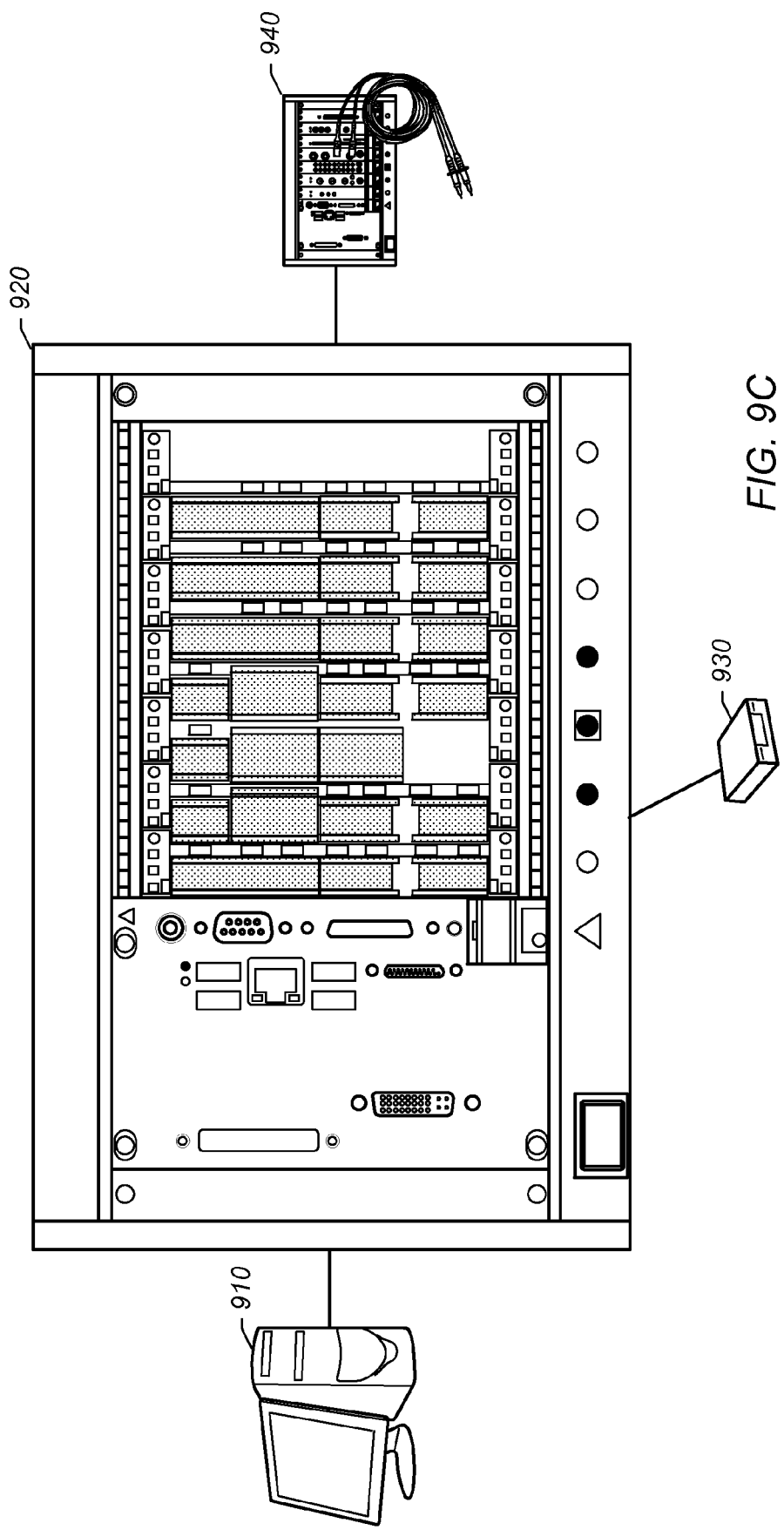

FIGS. 9A-9C are exemplary Figures corresponding to an exemplary weighted zoom, following the method of FIG. 7.

More specifically, in FIG. 9A, an exemplary diagram is shown where a computer 910 is coupled to chassis 920. The chassis 920 is coupled to a sensor 930 and another chassis 940. In FIG. 9B, the user has positioned the cursor over the chassis 920. In response to receiving user input to perform the weighted zoom (e.g., as described in 704 above), the diagram is updated in FIG. 9C. More specifically, as shown, the chassis 920's level of magnification has increased greatly, while the computer 910, the chassis 940, and the sensor 930's level of magnification has decreased to a lesser extent. Thus, in this exemplary weighted zoom, the focus of the zoom, chassis 920, had a much greater increase in level of magnification than the decrease in magnification of the other physical components in the diagram. Additionally, as indicated above, all of the physical components are still visible, unlike the type of effect that would occur if a normal zoom were performed (e.g., where all objects' level of magnification would increase the same causing one or more of the other physical components to no longer be displayed within the diagram or screen).

Figure 10A:
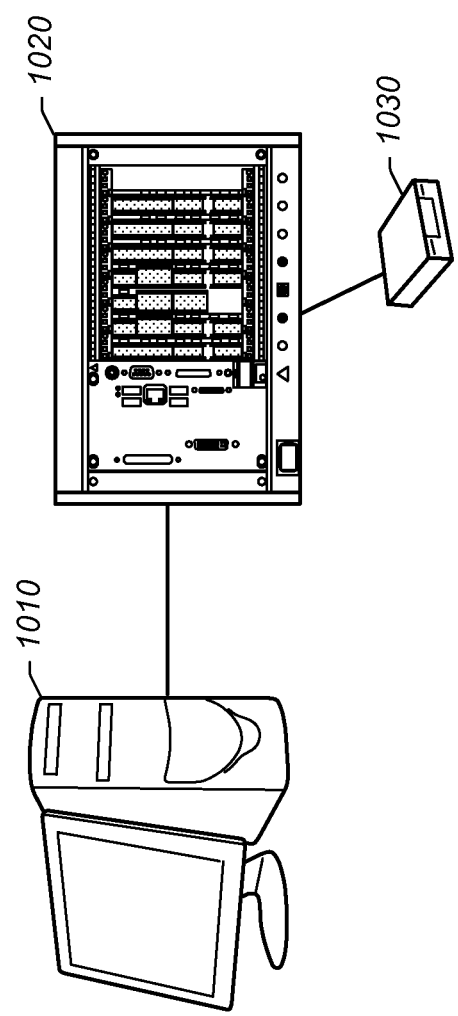
Figure 10B:
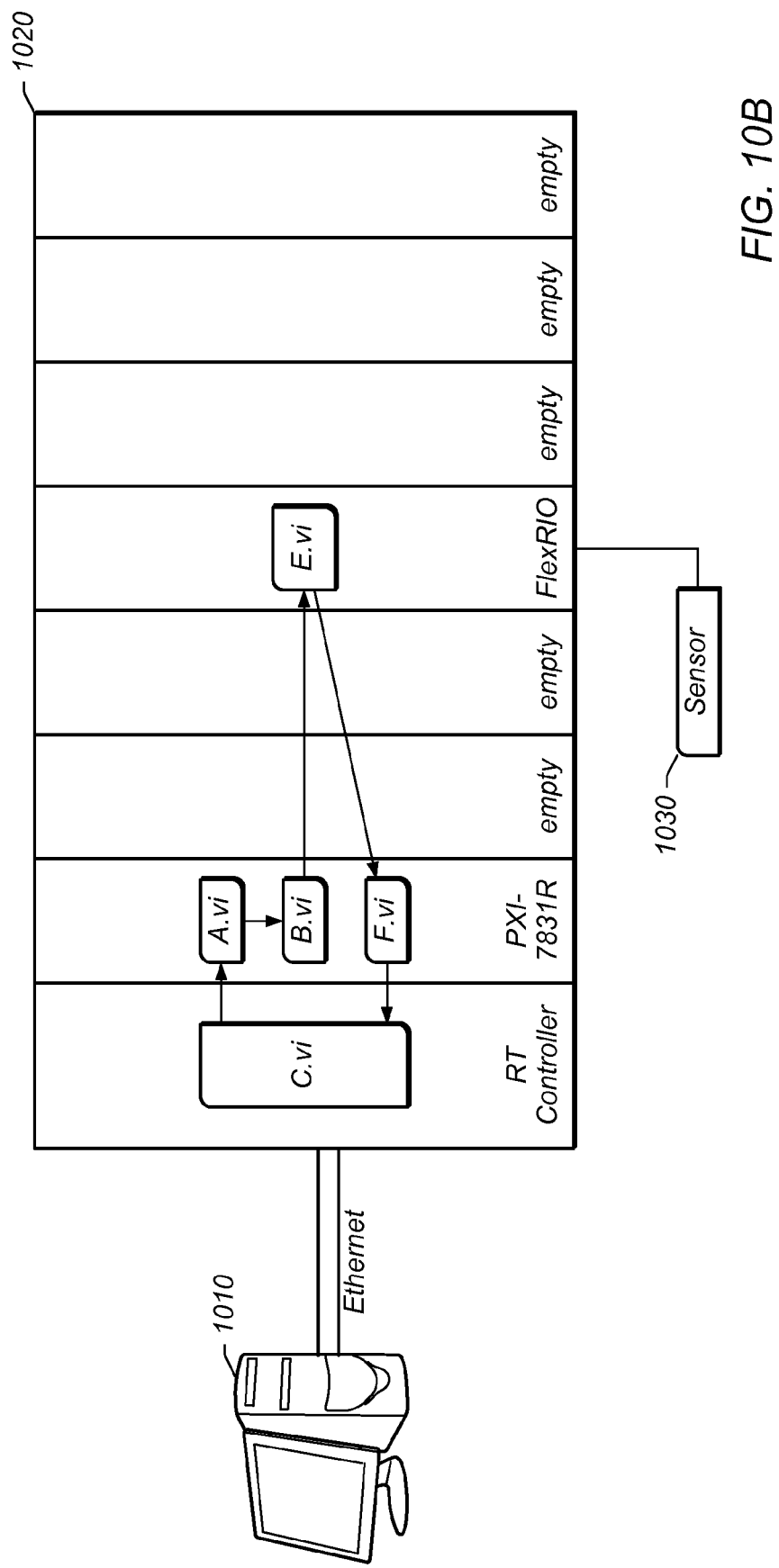

FIGS. 10A and 10B are exemplary Figure corresponding to a similar system where different representations are used for devices based on level of magnification or size (e.g., including features of both the weighted zoom of FIG. 7 and the semantic zoom of FIG. 8). As shown in FIG. 10A, a computer 1010 is coupled to a chassis 1020, which, in turn, is coupled to a sensor 1030. In response to receiving user input to zoom in on the chassis 1020, the diagram shown in FIG. 9B may be displayed.

As shown in this diagram, multiple representations have changed. For example, the chassis 1020 has changed from the picture of the chassis in FIG. 10A to a representation showing each slot of the chassis as well as logical elements deployed on devices in those slots. More specifically, an RT controller is plugged in to slot 1 and a graphical program "C.vi" has been deployed to that RT controller. Note that the graphical program may be deployed as software that is executed by processor(s) or may be implemented on a programmable hardware element of the RT controller, as desired. Additionally, PXI-7831R is plugged in to slot 2 of the chassis and graphical programs "A.vi", "B.vi", and "C.vi" have been deployed to that device. Finally, FlexRIO has been plugged in to slot 5 of the chassis and graphical program "E.vi" has been plugged deployed to that device. Thus, during the zoom between FIGS. 10A and 10B, the chassis 1020 reached a threshold level of magnification that caused the diagram environment to use a more complex representation of the chassis 1020 than is used in FIG. 10A.

Similarly, the sensor 1030 has changed from a picture representation to a simple box and label representation. Additionally, the wire connecting the chassis 1020 and the PC 1010 in FIG. 10A has split out into two wires representing two Ethernet cables connecting the chassis 1020 and the PC 1010. Finally, the level of magnification of both the PC 1010 and the sensor 1030 has changed (although only the sensor 1030 reached the threshold level of magnification to change representations). Thus, FIGS. 10A and 10B illustrate an exemplary weighted zoom where various ones of the icons representing physical elements change representations.

Figure 10C:
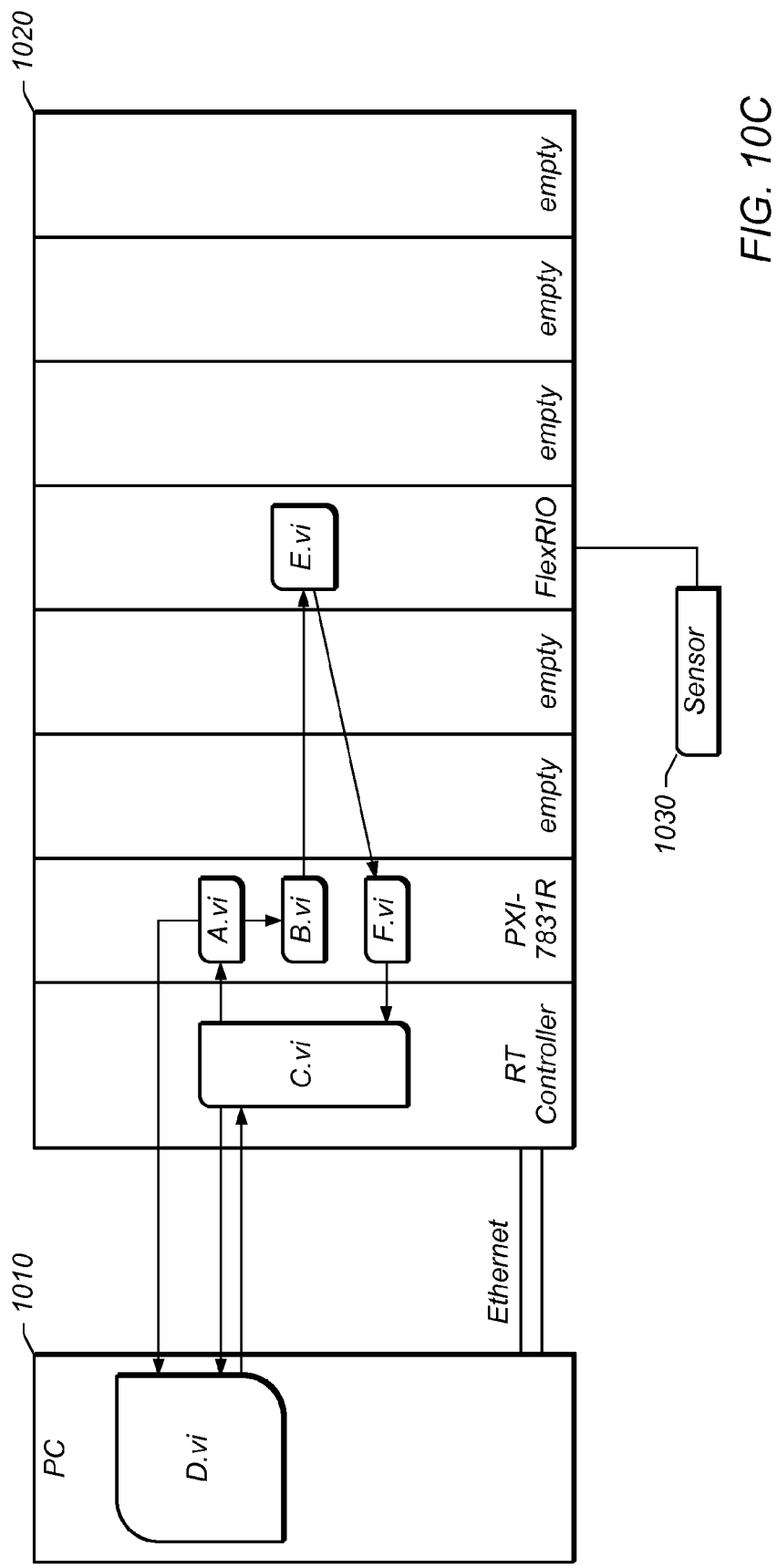

FIG. 10C is provided for illustration purposes only to show a system diagram of all of the components for FIGS. 10A and 10B. In this Figure, the icon representing the PC 1010 is shown with a representation including the logical element (in this case, a graphical program) "D.vi" deployed on the PC 1010. Additional wires are also shown representing logical connections between the D.vi and A.vi and C.vi that were not shown in FIG. 9B, due to the lack of logical element D.vi in the diagram.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory, computer accessible memory medium storing program instructions for performing semantic zoom in a diagram of a hardware system, wherein the program instructions are executable to:
   display the diagram of the hardware system, wherein the diagram comprises a plurality of icons representing electronic hardware components of the hardware system, wherein the diagram further comprises a plurality of graphical wires connecting the icons representing the electronic hardware components, wherein the graphical wires represent physical connectivity between the electronic hardware components in the hardware system, wherein the plurality of icons comprise a first icon representing a first electronic hardware component, wherein the first icon is displayed at a first level of magnification, wherein the first icon visually depicts a first representation of the first electronic hardware component;
   receive user input to zoom on a first position of the diagram, wherein the first icon is displayed proximate to the first position of the diagram;
   update the diagram to zoom on the first position in response to the user input, wherein said updating the diagram comprises displaying the first icon at a second level of magnification that is greater than the first level of magnification, wherein, after updating the diagram, the first icon visually depicts a second representation of the first electronic hardware component, and wherein the first representation is less complex than the second representation and shows less information regarding the electronic hardware component than the second representation, and wherein the second representation of the first electronic hardware component comprises one or more of:
      a detailed image of the first electronic hardware component;
      one or more icons representing software components implemented by or deployed on the first electronic hardware component; or
      a hardware schematic of the first electronic hardware component.

2. The non-transitory, computer accessible memory medium of claim 1, wherein the first representation comprises an image of the electronic hardware component.

3. The non-transitory, computer accessible memory medium of claim 1, wherein the first icon changing from visually depicting the first representation to visually depicting the second representation is based on the first icon exceeding a threshold level of magnification.

4. The non-transitory, computer accessible memory medium of claim 3, wherein below the threshold level of magnification, logical components corresponding to electronic hardware components are not displayed, wherein above the threshold level of magnification, logical components corresponding to the electronic hardware component are displayed.

5. The non-transitory, computer accessible memory medium of claim 1, wherein the first icon changing from visually depicting the first representation to visually depicting the second representation is based on the first icon exceeding a threshold size.

6. The non-transitory, computer accessible memory medium of claim 1, wherein during said displaying the diagram, other ones of the plurality of icons are displayed at a third level of magnification, wherein after said updating the diagram, the other ones of the plurality of icons are displayed at a fourth level of magnification that is less than the third level of magnification.

7. The non-transitory, computer accessible memory medium of claim 1, wherein said receiving user input comprises receiving a gesture to a touch interface.

8. A method for performing semantic zoom in a diagram of a hardware system, comprising:
   displaying the diagram of the hardware system, wherein the diagram comprises a plurality of icons representing electronic hardware components of the hardware system, wherein the diagram further comprises a plurality of graphical wires connecting the icons representing the electronic hardware components, wherein the graphical wires represent physical connectivity between the electronic hardware components in the hardware system, wherein the plurality of icons comprise a first icon representing a first electronic hardware component, wherein the first icon is displayed at a first level of magnification, wherein the first icon visually depicts a first representation of the first electronic hardware component;
   receiving user input to zoom on a first position of the diagram, wherein the first icon is displayed proximate to the first position of the diagram;
   updating the diagram to zoom on the first position in response to the user input, wherein said updating the diagram comprises displaying the first icon at a second level of magnification that is greater than the first level of magnification, wherein, after updating the diagram, the first icon visually depicts a second representation of the first electronic hardware component, and wherein the first representation is less complex than the second representation and shows less information regarding the electronic hardware component than the second representation, and wherein the second representation of the first electronic hardware component comprises one or more of:
   a detailed image of the first electronic hardware component;
   one or more icons representing software components implemented by or deployed on the first electronic hardware component; or
   a hardware schematic of the first electronic hardware component.

9. The method of claim 8, wherein the first representation comprises an image of the electronic hardware component.

10. The method of claim 8, wherein the first icon changing from visually depicting the first representation to visually depicting the second representation is based on the first icon exceeding a threshold level of magnification.

11. The method of claim 10, wherein below the threshold level of magnification, logical components corresponding to electronic hardware components are not displayed, wherein above the threshold level of magnification, logical components corresponding to the electronic hardware component are displayed.

12. The method of claim 8, wherein the first icon changing from visually depicting the first representation to visually depicting the second representation is based on the first icon exceeding a threshold size.

13. The method of claim 8, wherein during said displaying the diagram, other ones of the plurality of icons are displayed at a third level of magnification, wherein after said updating the diagram, the other ones of the plurality of icons are displayed at a fourth level of magnification that is less than the third level of magnification.

14. The method of claim 8, wherein said receiving user input comprises receiving a gesture to a touch interface.

* * * * *